(12) United States Patent
Oya et al.

(10) Patent No.: US 6,302,941 B1
(45) Date of Patent: Oct. 16, 2001

(54) METHOD FOR OPERATING A BLAST FURNACE

(75) Inventors: Kenji Oya; Shigeru Wakita; Yasukazu Hayasaka; Hajime Wakai, all of Fukuyama (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/556,569

(22) Filed: Apr. 24, 2000

Related U.S. Application Data

(63) Continuation of application No. PCT/JP98/04951, filed on Nov. 2, 1998.

(30) Foreign Application Priority Data

| Nov. 4, 1997 | (JP) | 9-301943 |
| Feb. 6, 1998 | (JP) | 10-025560 |
| Feb. 6, 1998 | (JP) | 10-025561 |

(51) Int. Cl.$^7$ .................................................. C21B 5/00
(52) U.S. Cl. .............................. 75/382; 75/467; 266/80; 266/88
(58) Field of Search .................... 75/382, 467; 266/80, 266/88

(56) References Cited

U.S. PATENT DOCUMENTS 5,585,914 * 12/1996 Yamasaki et al. ..................... 356/44

FOREIGN PATENT DOCUMENTS

| 53-18418 | 2/1978 | (JP) . |
| 61-19708 | 1/1986 | (JP) . |
| 4-268006 | 9/1992 | (JP) . |
| 5-156327 | 6/1993 | (JP) . |
| 5-239518 | 9/1993 | (JP) . |
| 8-82553 | 3/1996 | (JP) . |

* cited by examiner

Primary Examiner—Melvyn Andrews
(74) Attorney, Agent, or Firm—Frishauf, Holtz, Goodman, Langer & Chick, P.C.

(57) ABSTRACT

A method for producing a molten iron in a blast furnace comprises the steps of: preparing an optical fiber covered with a metallic tube; measuring a temperature of the molten iron flow discharged from a tap hole of the blast furnace by means of making use of a metallic tube covered by the optical fiber to obtain an information of the temperature of the molten iron; and controlling a heat conditions of the blast furnace, based on the obtained information of the temperature of the molten iron. Controlling a heat conditions is achieved by using a heat conditions estimation model, and by inferring a level and a transition of the heat conditions in the furnace.

21 Claims, 19 Drawing Sheets

A: Initial stage of tapping
B: After the later stage of tapping

FIG.14
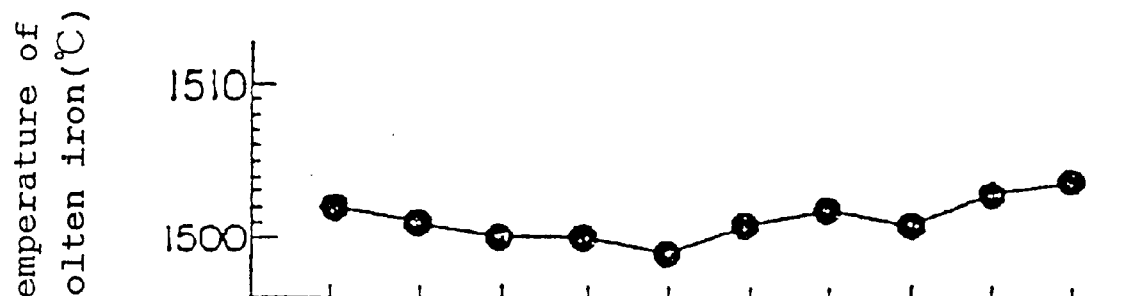
(a)
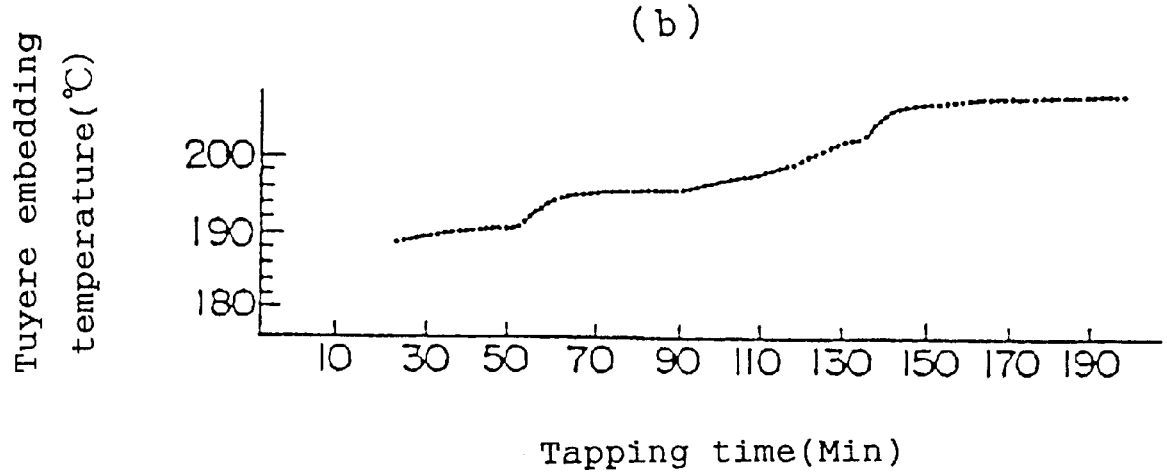
(b)
Tapping time(Min)

METHOD FOR OPERATING A BLAST FURNACE

This application is a continuation application of International application PCT/JP98/04951 filed Nov. 2, 1998.

FIELD OF THE INVENTION

The present invention relates to a method for operating a blast furnace in which a heat conditions in the furnace is controlled.

BACKGROUND OF THE INVENTION

In producing molten iron by a blast furnace, iron ore as iron raw material, coke as fuel, lime stone as by-product, etc. are introduced into the furnace from the top thereof, and hot blast is blown into the furnace from a tuyere in the lower portion thereof to burn the coke, so that the iron ore is reduced by the generated reducing gases mainly comprising CO and heat energy. As a result, the iron content of the iron ore becomes the main component of molten iron, while the gangue minerals of the iron ore, and the ashes of the coke become slag together with the limestone, both of which are periodically discharged from a tap hole and a slag hole, respectively, of the lower portion of the furnace. In the blast furnace, the molten iron is produced by the process of high-temperature reaction of the raw material and the reducing gases, and thus it is very important to maintain a stationary state while maintaining a material balance and a heat balance. There is a strong demand for maintaining the stability of furnace conditions in the operation of the blast furnace.

Therefore, in order to maintain the stable conditions of the blast furnace, it is an essential condition to sufficiently control heat conditions in the furnace.

The heat conditions in the blast furnace is divided into the level of heat conditions and the transition of heat conditions, and is one of items regarded as the most important information which reflects the in- furnace conditions such as reaction in the furnace, etc. The level of heat conditions and the transition of the heat conditions basically significantly affect the temperature of molten iron. Therefore, in order to stabilize the operation of the blast furnace and in order to decrease the unit fuel consumption, and in order to improve productivity and quality of molten iron, it is very important to measure, correctly and precisely, the temperature of the molten iron with a short time delay, to control the heat conditions in the furnace, on the basis of the information of the temperature measurement, and adjust, correctly and precisely, the temperature of the molten iron, to a target level. However, for the heat conditions in the blast furnace, conventionally, the level of the heat conditions in the furnace is evaluated by the temperature of the molten iron after tapping, and the heat conditions transition is evaluated and inferred from information from the various sensors arranged in the blast furnace.

(1) The Level of Heat Conditions.

Generally, in tapping in a blast furnace, molten iron is injected from the tap hole, passed through a long runner having a length of as long as about 20 m, and flows into a skimmer. As the position and method of measuring the temperature of the molten iron, a method is conventionally employed in which the molten iron and slag are separated by the skimmer on the basis of the difference in a specific gravity so that the slag floats on the molten iron, and then the temperature of the molten iron is measured. The temperature is measured by using an immersion type thermocouple thermometer. On the inner surface of the runner is formed a runner comprising a monolithic refractory. Therefore, the temperature of the tapped molten iron is decreased due to heat extraction by heat conduction to the runner and heat radiation to air in the course of passage through the runner. In tapping, the diameter of the tap hole is increased due to wearing by the slag, and thus the tapping rate changes with the passage of the tapping time.

The temperature of the molten iron measured in the skimmer is affected by heat extraction from the molten iron in the runner and a change in the tapping rate (t/min) to greatly change during the time from the start to end of tapping. The temperature is generally low in the initial stage of tapping, and then gradually increases to the highest temperature in the last stage of tapping. Conventionally, the highest temperature is used as the temperature of the molten iron.

The blast furnace is generally operated so that the tapping rate is slightly higher than the production rate of the molten iron in the furnace. Therefore, tapping from the predetermined tap hole is performed for about 3 to 4 hours at a time, and then the tap hole is closed to wait until a molten iron is produced and again accumulated in the vicinity of the tap hole. However, during this waiting time, another tap hole is opened for tapping in the same way. Generally, tapping is carried out through an opposite tap hole of the furnace for about 3 to 4 hours at a time. During tapping through the other tap hole, the temperature of the runner provided on the predetermined tap hole is decreased. Therefore, when measuring the temperature of the molten iron in the skimmer during next tapping, the temperature changes in such a manner that it is low in the initial stage, and reaches the highest temperature in the last stage. However, such changes in the temperature of the molten iron measured in tapping are not constant, and greatly vary from one tapping to another, as shown later in FIG. 11.

FIG. 11 shows an example of measurement results of the temperature of a molten iron by a conventional method. FIG. 8 shows the results of measurement only in tapping in which the highest temperature was actually 1500 to 1510° C. in 8 to 12 temperature measurements of the molten iron at one tapping. This graph indicates that in the conventional method of measuring the temperature of the molten iron, even in cases at the same level of highest temperature, variations occur in the first temperature measurements, and the rising patterns from the initial stage to the last stage at the highest temperature are not constant. Therefore, it is difficult to not only infer the highest temperature from the first temperature measurement, but also infer the highest temperature from the temperature measurement in the course from second measurement to later measurement.

Also, since the runner of the spout comprising a monolithic refractory is worn by a slag flow, the runner is generally changed for every 2 to 3 weeks. In first tapping after the runner is 7repaired, the sensible heat of the tap runner is small, and thus heat extraction from the molten iron to the tap runner is further increased. In measuring temperature of the molten iron in first tapping after the tap runner is constructed, the initial measurement is further decreased.

In accordance with conventional temperature measurement of the molten iron in the skimmer, the temperature of the molten iron changes in such a manner that it increases with the passage of time from the start of tapping, and reaches the highest temperature in the last stage. However, for the above-mentioned reasons, the rising curve of temperature greatly varies from one tapping to another.

In the temperature of the molten iron in the skimmer in the initial stage of tapping, the temperature of the molten iron in the furnace greatly decreases with low precision, and a long time is required until the temperature of the molten iron in the skimmer reaches the tapping temperature and is stabilized. Furthermore, even if the measurement in the skimmer is corrected by data from many operations, it is difficult to correctly infer the temperature of the molten iron in the furnace. It is also difficult to know the temperature with a short time delay.

For the above reasons, in the conventional method of measuring the temperature of a molten iron, for the temperature of the molten iron permitting evaluation of t he level of the heat conditions, only 1 item of data can be obtained in 3 to 4 hours required for one time of measurement. Therefore, the conventional method has problems as means for evaluating the heat conditions in the furnace.

(2) Heat Conditions Transition

As described above, the transition pattern of the temperature of the molten iron varies from one tapping to another, and large variations occur in the patterns. Furthermore, since information of the temperature of the molten iron at a measurement time in the skimmer is accompanied with a time delay for inferring heat conditions transition, the action of controlling heat conditions is also delayed. Therefore, information of only the temperature of the molten iron measured by the conventional measurement method causes a delay in the action on the operation of a blast furnace, thereby making impossible the operation under stable conditions. Therefore, in order to prevent a delay in the action, information from various sensors is employed for determining the heat conditions transition. Typical examples of such sensors include an embedded tuyere sensor comprising a thermocouple embedded in the vicinity of the tuyere of the blast furnace, a furnace exhaust gas sensor and the like. These sensors are provided for measuring the temperature of the furnace in the vicinity of the tuyere, and the components of the furnace exhaust gases to detect a change in the heat conditions at rapid timing and measure the heat conditions transition without a time delay.

Although the absolute value of the temperature (referred to as "the embedded tuyere temperature" hereinafter) measured by the embedded tuyere sensor is significantly lower than the temperature of the molten iron, data of the temperature of the molten iron can be continuously obtained in an early stage by combination with information of other sensor values. Therefore, the embedded tuyere sensor is essential for determining the heat conditions transition. The embedded tuyere sensor is also effective for determining the heat conditions level in a degree depending upon the type of the sensor.

FIG. 12(a) shows an example of correspondence between the measurement results of the molten iron temperature by the conventional method and the measurement results of the embedded tuyere temperature during three successive times of tapping comprising A tapping, B tapping and C tapping. In the figure, information of heat conditions based on the temperature shown by each of points $P_1$, $P_2$ and $P_3$ on the curve of the embedded tuyere temperature should be reflected corresponding to information of heat conditions based on the temperature shown by each of points $P_1'$, $P_2'$ and $P_3'$ on the measurement curve of the molten iron temperature. Namely, the gradient of the embedded tuyere temperature, which indicates a rise in temperature basically appears as a rise in the temperature of the molten iron after a predetermined time has passed, thereby causing the problem of a time delay in reflection to the measurements of the molten iron temperature by the conventional method. In addition, in the temperature curve obtained by the conventional method of measuring the molten iron temperature, the temperature of the molten iron cannot be generally correctly measured until the last stage of each tapping, and the measured temperature always rises at intermediate points. Therefore, by using the measurement results of the molten iron temperature by the conventional method, it is impossible to decide the heat conditions transition, i.e., decide as to whether the molten iron temperature tends to rise or fall. Consequently, as means for determining the heat conditions transition, temperature information obtained by various furnace sensors is conventionally used.

(3) Conventional Method of Controlling Heat Conditions

Control of the heat conditions requires information of the measurements of the molten iron temperature and various sensor values, a heat conditions estimation model using these information, and a heat conditions correction model for determining an optimum control item and the amount of control thereof on the basis of the heat conditions inferd by the heat conditions estimation model.

An example of the conventional method of controlling heat conditions is described with reference to an example of correspondence between the measurement results of the molten iron temperature by the conventional method, and the measurement results of the embedded tuyere temperature using the embedded tuyere thermocouple as a sensor, which is shown in FIG. 12(a) and FIG. 12(b). However, it is assumed that the present state is at the end of B tapping.

The heat conditions level and the heat conditions transition are determined by the method below, and ranked to infer heat conditions, and then an action is made on the basis of the action correcting rule.

① The present heat conditions level is determined as follows. The correlation between measurement information (for example, the embedded tuyere temperature and the analytical values of the exhaust gases from the furnace top) from various sensors, and the maximum measurement of the temperature of the molten iron in the skimmer in the present tapping is determined from data of past actual operations by a statistical method using, for example, a membership function. On the basis of the correlation, the highest temperature of the molten iron, i.e., each heat conditions level, can be inferd from each of the sensor values. Thus, on the basis of the correlation between the sensor value and the heat conditions level, the heat conditions level corresponding to the value of each of sensors obtained at this time is inferred. For example, for the embedded tuyere sensor, the heat conditions level is inferd from the sensor value at the point $P_1$ shown in FIG. 12(b).

Similarly, the correlation between the temperature measurement of the molten iron in the skimmer measured in the first tapping or intermediate tapping and the highest temperature of the molten iron in this tapping is previously determined from data of past actual operations by a statistical method using, for example, a membership function. By using this correlation, the heat conditions level is inferred from the molten iron temperature measured, for example, the measurement of the molten iron temperature at the point $P_1'$ shown in FIG. 12(a).

Each of the thus-inferd heat conditions levels is weighted by the predetermined method to obtain a value considered as the present heat conditions level. Some ranks are previously provided to be centered at the temperature region of the target value of the heat conditions level so that the rank of the present heat conditions level can be determined.

② The present heat conditions transition is determined as follows. For the embedded tuyere sensor among the various sensors, the temperature gradient from point $Q_1$ to $Q_2$ shown in FIG. 12(b) is determined by statistical means. Similarly, for the other sensors, the temperature gradient is determined according to this method. The temperature gradient of each of the sensors is weighted by the predetermined method to infer the heat conditions transition. For the heat conditions transition, some ranks are previously provided to be centered at the region at gradient 0 (zero) so that the rank of present gradient is determined.

③ By using the heat conditions level rank and transition rank determined above in ① and ②, respectively, the corresponding point in a matrix (i.e., an action matrix) of predetermined heat conditions level ranks and transition ranks is determined to infer the present heat conditions.

④ For the thus-inferred present heat conditions, correction is made according to the corresponding position of the present heat conditions in the action matrix. The action is performed based on the action correction rule obtained from the predetermined heat conditions correction model. The action correction rule mainly comprises the empirical rule of experts, and cannot be determined collectively. A typical factor of the action correcting operation is the amount of the steam blown into the tuyere blast, and the action amount changes with specific operation conditions in the blast furnace, particularly the raw materials used and conditions for loading the raw materials, etc., and cannot be determined collectively.

As the corrected heat conditions estimation model, for example, Japanese Examined Patent Publication No. 7-26127 discloses a method in which in the method of inferring the heat conditions level and heat conditions transition from the measurements of the molten iron temperature and information of sensor values, fidelity is introduced to infer heat conditions by using a three-dimensional function of the heat conditions level or heat conditions transition inferd from the molten iron temperature, information of sensor values, and fidelity, which are shown on three axes.

However, the conventional method of controlling blast heat conditions has the following problems:

Since the temperature of a molten iron is measured in the skimmer, for the above reasons, only the highest temperature of the molten iron measured in the last stage of tapping can be used as a correct heat conditions level. Namely, the correct temperature of the molten iron cannot be obtained until the last stage of each tapping, and thus reliable data of the heat conditions level can be obtained only once for about 3 to 4 hours. This decreases the precision of the inference of the heat conditions level.

Furthermore, the measurements of the temperature of the molten iron in an intermediate period of tapping have low reliability, and thus cannot be used as data for correcting the heat conditions transition. In addition, data with high reliability for inferring the heat conditions level can be obtained at a low frequency, and thus has a long time delay as data for inferring the heat conditions transition. Therefore, the variations in the conventional measurements of the temperature of the molten iron cannot be used as data for correcting the heat conditions transition.

On the other hand, reliable information superior to the highest temperature information of the molten iron cannot be obtained as the heat conditions level or the heat conditions transition from various sensor values conventionally used for controlling heat conditions in operations of the blast furnace, for example, the embedded tuyere temperature, the analytical values of the gases at the furnace top, the shaft temperatures at many positions, etc., as described above with respect to the embedded tuyere temperature.

SUMMARY OF THE INVENTION

An object of the present invention is to provide a method for operating a blast furnace, which is capable of promoting to stabilize the furnace conditions, to decrease the production cost of the molten iron, and to produce the low—silicon molten iron.

In order to achieve the above-mentioned object, the present invention provides a method for operating a blast furnace to produce a molten iron, which comprises the steps of, preparing an optical fiber covered with a metallic tube;

measuring a temperature of the molten iron flow discharged from a tap hole of the blast furnace by means of making use of the optical fiber covered with themetallic tube to obtain an information of the temperature of the molten iron; and, controlling a heat conditions of the blast furnace, based on the obtained information of the temperature of the molten iron The molten iron flow, which is produced by the blast furnace, is preferably the molten iron, whose Si content is low.

The molten iron flow is preferable to a jet flow from a tap hole until a runner. The step of controlling the heat conditions in the furnace may comprise controlling the heat conditions to produce a silicon content of 0.3 wt. % or less. Furthermore, the step of controlling the heat conditions in the furnace may comprise the step of controlling the heat conditions in the furnace to reduce a fuel ratio.

First, the step of controlling the heat conditions in the furnace may comprise:

determining a control target temperature($T_1$) lower than a control target temperature($T_2$), on measuring the temperature of the molten iron in a skimmer;

determining a range of a control temperature from ($T_1$−a) to ($T_1$+a), on the basis of the control target temperature ($T_1$); and, taking an operational action for maintaining the range of the control temperature.

Second, the step of controlling the heat conditions in the furnace may comprise:

determining a control target temperature ($T_1$) lower than a control target temperature($T_2$) on measuring the temperature of the molten iron in a skimmer;

determining a range(±a) of the control target temperature narrower than the range of the control target temperature(±b) on measuring the temperature of the molten iron in the skimmer;

taking an operational action for mauntaining the range of the control target temperature from ($T_1$−a) to ($T_2$+a).

The above-mentioned method for operating a blast furnace may comprise the step of detecting an activation degree of the dead man of the blast furnace, on the obtained information of the molten iron temperature.

The step of detecting an activation degree of the dead man of the blast furnace, comprises;

comparing a molten iron temperature($T_s$) in the initial tapping time with a minimum molten iron temperature ($T_{min}$) in the tapping time except for the initial tapping time, to calculate $\Delta T = T_s - T_{min}$;

continuing the above-mentioned tap step, during at least twice tap or more; and inferring a state of the dead man from the ΔT transition.
The above-mentioned method for operating the blast furnace may comprise controlling an injection amount of a pulverized coal, based on the obtained information of the molten iron temperature.

In the above-mentioned method for operating the blast furnace, one method is preferable, which is selected from the group consisting of the following control method for heat conditions in the furnace.

The first method for controlling the heat conditions comprises the steps of:
  providing a heat conditions estimation model formed by using an empirical rule and a expert knowledge for the operation of the blast furnace;
  inferring a heat conditions level and a heat conditions transition by using the heat conditions estimation model, on the basis of the obtained temperature information, to obtain a result of the inference of the heat conditions;
  taking an action of correcting an operation factor of the blast furnace by using the empirical rule and the expert knowledge for the operation of the blast furnace, on the basis of the obtained temperature information, to control the temperature of the molten iron.

The second method for controlling the heat conditions comprises the steps of:
  providing the heat conditions estimation model formed by using the empirical rule and the expert knowledge for the operation of the blast furnace;
  inferring the heat conditions level and the heat conditions transition by using the heat conditions estimation model, on the basis of the obtained information of the molten iron temperature, to obtain the inference of the heat conditions level and the heat conditions transition;
  displaying the result of inference of the heat conditions by display means;
  taking an action of correcting an operational factor of the blast furnace by using the empirical rule and the expert knowledge for the operation of the blast furnace, on the basis of the displayed inference result, to control the temperature of the molten iron.

The third method for controlling the heat conditions comprises the steps of:
  automatically taking the correcting action of an operational factor of the blast furnace by using en artificial intelligence system, to control the temperature of the molten iron,
  the artificial intelligence system has the steps of
    providing the heat conditions estimation model formed by using the empirical rule and the expert knowledge for the operation of the blast furnace;
    inferring the heat conditions level and the heat conditions transition by using the heat conditions estimation model, on the basis of the obtained information of the molten iron temperature, to obtain the inference result of the level and transition of heat conditions.
    providing the heat conditions correcting model formed by using the empirical rule and the expert knowledge for the operation of the blast furnace; and,
    taking the correcting action of the operation factor of the blast furnace by using the heat conditions correcting model, on the basis of the inferred result.

The fourth method for controlling the heat conditions comprises the steps of:
  providing the heat conditions estimation model formed by using the empirical rule and the expert knowledge for the operation of the blast furnace;
  inferring the heat conditions level and the heat conditions transition by using the heat conditions estimation model formed by using the empirical rule and the expert knowledge for the operation of the blast furnace;
  deciding whether the inferred heat conditions is in a stationary state or in an unstationary state;
  taking the correcting action of the operational factor of the blast furnace by the operator using the empirical rule and the expert knowledge for the operation of the blast furnace, to control the temperature of the molten iron.

The fifth method for controlling the heat conditions comprises the steps of:
  providing the heat conditions estimation model formed by using the empirical rule and the expert knowledge for the operation of the blast furnace;
  inferring the level and transition of the heat conditions by using the heat conditions estimation model formed, based on the empirical rule and the expert knowledge for the operation of the blast furnace;
  deciding whether the inferred heat conditions is in the stationary state or in the unstationary state;
  displaying the result of decision on the heat conditions by display means; and
  taking the correcting action of the operation factor of the blast furnace by the operator using the empirical rule and the expert knowledge for the operation of the blast furnace, to control the temperature of the molten iron.

The sixth method for controlling the heat conditions comprises the steps of:
  providing the heat conditions estimation model formed by using the empirical rule and the expert knowledge for the operation of the blast furnace;
  inferring the heat conditions level and the heat conditions transition by using the heat conditions estimation model, on the basis of the obtained information of the molten iron temperature, to obtain the inference result of the heat conditions;
  deciding whether the inferred heat conditions is in the stationary state or in the unstationary state;
  providing the heat conditions correcting model formed by using the empirical rule and the expert knowledge for the operation of the blast furnace; and,
  taking the correcting action of the operation factor of the blast furnace by using the heat conditions correcting model, on the basis of the inference of the heat conditions.

BRIEF DESCRIPTION OF THE DRAWING

FIG. 14 is a graph showing an example of measurement results of the molten iron temperature and the embedded tuyere temperature measured by the Best mode 3 of the present invention.

DISCLOSURE OF THE INVENTION

Best Mode 1

The inventors have found that furnace conditions would be stabilized by carrying out the following items:

(a) Enforcing an optical fiber with metallic tubes so as to give rigidity thereto, and designing a wire-like optical sensor unit in response to conditions of the molten iron flow to be measured.

(b) Measuring the temperature of the molten iron by using the wire-like optical sensor unit.

(c) Controlling the heat conditions control factors, on the basis of the information of the measured temperature.

The Best mode 1 has been carried out on the basis of this finding.

The method for operating a blast furnace to produce a molten iron according to the Best mode 1, is as follows:

preparing the optical fiber covered with the metallic tubes;

measuring the temperature of the molten iron flow exhausted from a tap hole of a blast furnace, by using the optical fiber covered with the metallic tubes, and obtaining the temperature information of the molten iron; and controlling the heat conditions of the blast furnace, on the basis of the obtained temperature information of the molten iron.

It is preferable that the flow of the molten iron is a jet flow which is dropping from a tap hole onto a runner. It is desirable that the molten iron produced by the blast furnace is low in Si content. The molten iron of low Si content herein is meant by the Si concentration being 0.30 wt % or lower.

(1) Method for Measuring the Temperature of a Molten Iron

The temperature sensor made of the optical fiber is inserted into the flow of the molten iron jetting out from the tap hole of the blast furnace to obtain optical signals from the optical fiber, and the temperature of the flow of molten iron is measured from an optical energy and a wave length distribution thereof by using a radiation thermometer. The temperature is continuously measured while the sensor is inserted into the flow of the molten iron and is recorded into a temperature recorder. The temperature of the flow of the molten iron measured in this way has a value, which is approximate to the temperature of the molten iron in the furnace. Therefore, according to the invention, this method is employed to know the temperature of the molten iron in the furnace. The temperature is measured by this method during the period of pouring the molten iron. The measurement is continuously carried out, for example, approximately 10 to 20 seconds per once, and is carried out several times during the period of 1 pouring of the molten iron. In measuring approximately 10 to 20 seconds per once, the temperature of the molten iron may be exactly determined by means of the optical fiber sensor.

Subsequently a method for measuring the temperature of the molten iron flowing out of the tap hole will be described in reference to the drawings.

Figure 1:
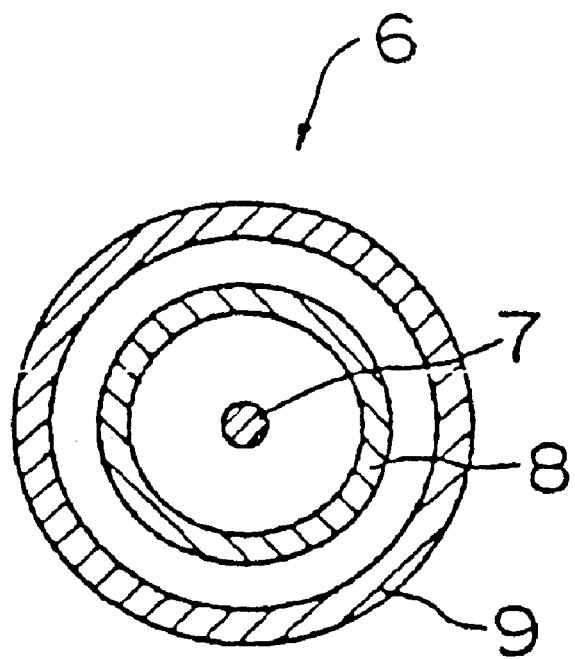
FIG. 1 is a transverse sectional view showing a structural example of an optical fiber covered with a metallic tube which is used by the Best mode 1 of the present invention.

FIG. 1 is a schematically sectional view showing a structural example of the optical fiber, wherein the optic fiber is covered with metallic tubes employed in the best mode 1. In FIG. 1, 7 is an optical fiber, 8 is a metallic inner tube and 9 is a metallic outer tube. The optical fiber 7 is covered with the metallic inner tube 8 and the metallic outer tube 9, and is thus provided as a double-structured wire-shaped optical sensor unit 6. With the metallic tubes covering the optical fiber 7 in this way, the optical fiber 7 is prevented from being broken due to dynamics pressure under a high temperature of the flow of the molten iron, and simultaneously the wearing rate by melting is reduced in the high temperature environment.

Figure 2:
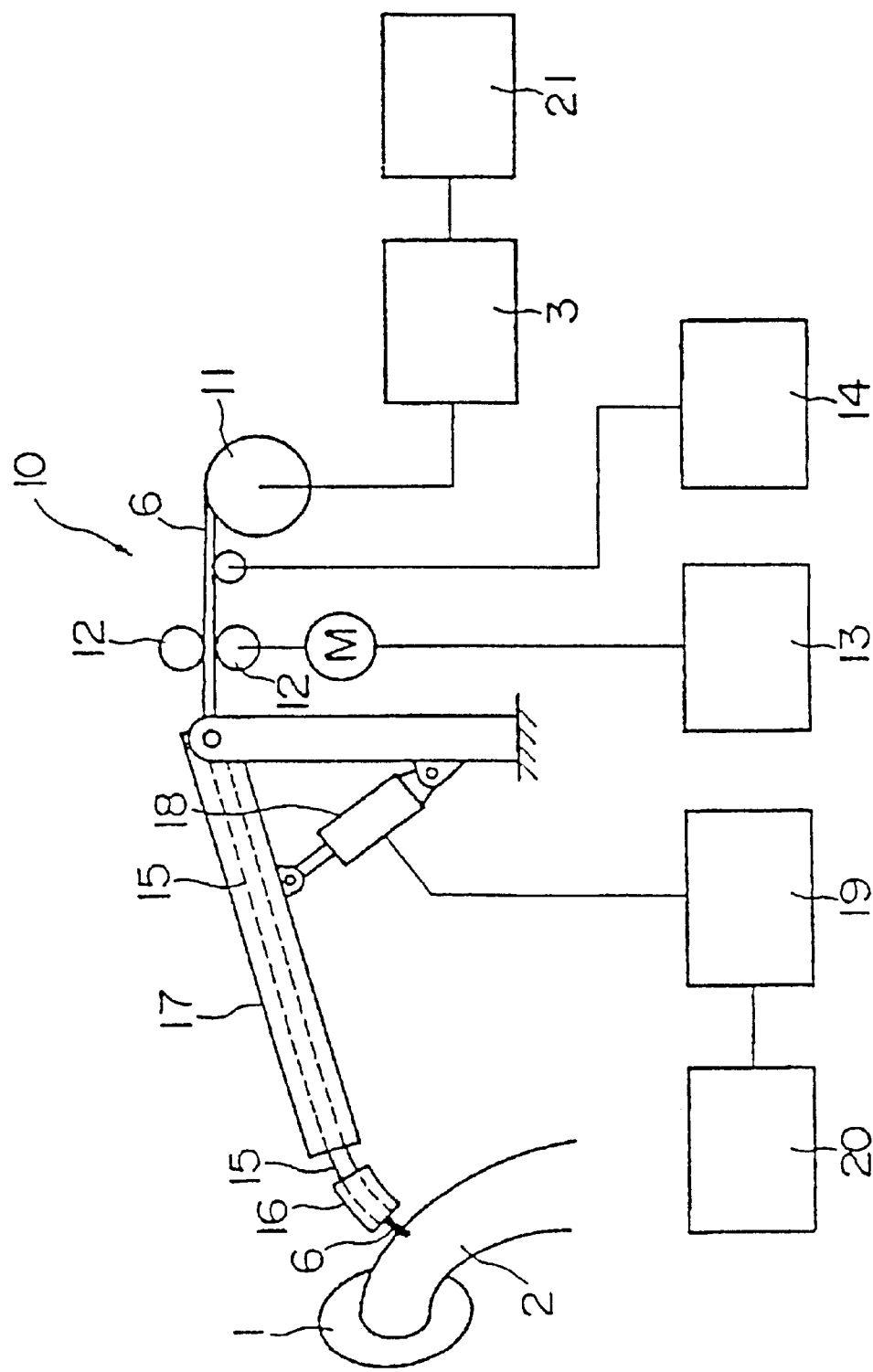
FIG. 2 is a schematic view showing a structural example of a temperature measuring apparatus which is used by the Best mode 1 of the present invention.

FIG. 2 is a schematic view showing a structural example of a temperature measuring device to be employed in practice of the invention. In FIG. 2, 1 is a tap hole of the blast furnace, 2 is a flow of the molten iron, 3 is a radiation thermometer and 10 is a delivery mechanism for feeding the optical sensor unit 6.

The optical sensor unit 6 is inserted into the flow of the molten iron 2 pouring out of the tap hole 1 of the blast furnace. In this case, the optical sensor unit 6 is of the structure as described in reference to FIG. 1. Since the optical sensor unit 6 is consumed due to the flow of molten iron 2, the optical sensor unit 6 is wound on a rotating drum 11 as a supply source so that it may be fed out of the supply source at a predetermined speed while the temperature is measured. The optical sensor unit 6 is fed out at a delivery mechanism 10, wherein the feeding amount of the optical sensor unit 6 is adjusted by pinch rolls 12 which are operated by a speed controller 13 and a speed sensor 14. On the other hand, there are provided a mechanism for exactly inserting the optical sensor unit 6 into the flow of the molten iron 2 and a mechanism for holding the optical sensor unit 6 to prevent the latter from being bounded out of the flow of the molten iron 2. Namely, the optical sensor unit 6 is supplied as sliding through a guide pipe 15 immediately before it is inserted into the flow of the molten iron 2. The guide pipe 15 is fixed to a front end guide 16 and to a support frame 17. For the purpose of striking the front end of the optical sensor unit 6 into the flow of the molten iron 2, the position for holding the guide pipe 15 is determined by a drive unit 18, a drive controller 19, an object detector 20 and the support frame 17.

Thus, when the front end of the optical sensor unit 6 is inserted into the flow of the molten iron 2, the radiant rays of the flow of the molten iron 2 enter at the front end of the optical fiber 7 and reach a radiation thermometer 3 through an optical connector of the rotary type which is connected to the opposite end of the optical fiber 7, and there, the radiant rays are converted into a temperature which is recorded into a temperature recorder 21. In this way, the temperature of the flow of the molten iron 2 may be exactly and precisely measured without a time lag.

According to the temperature measurement of the molten iron by means of a conventional skimmer, it takes several minutes until a stabilized result of temperature measurement is obtained after starting to pour the molten iron. However, if measuring the temperature of the flow of the molten iron of the present method, an exact temperature is available in approximately 10 to 20 seconds.

(2) A First Utilization for Operating the Blast Furnace

A first utilization for the blast furnace is to lower a reference temperature for controlling the temperature of the molten iron at the time of a normal operation.

The condition for setting blast heat conditions governing factors is corrected each time one measured value is obtained regarding the temperature of molten iron during the pouring period. Here, in case one measured value is obtained regarding the temperature of the molten iron, the temperature is measured approximately 5 to 8 times during one pouring period of 3 to 4 hours. With one measurement being performed continuously in 10 to 20 seconds, one measured value is obtained. The reference for controlling the temperature of the molten iron is an important item in controlling the operation of the blast furnace. Therefore, at first, a target value is determined for controlling the temperature of the molten iron at the normal operation time, and a predetermined temperature tolerance is set above and below the target value to provide a control region of the temperature of molten iron. Furthermore, a lower limit control value (called as "abnormal lower limit control value" hereinafter) for deciding the temperature of molten iron as an abnormal lower temperature is discriminated from the lower limit value of the temperature control region of the molten iron at the time of the normal operation, and is separately determined in the lower temperature region. In case of the method for measuring the temperature of the molten iron by means of a conventional skimmer, the target value is generally determined, for example, as 1520° C. for controlling the temperature of the molten iron in operating the blast furnace with the temperature control region being set as 1520±15° C. In contrast to this, according to the best mode 1, the temperature control target value is made lower than the conventional one, for example, by 25° C., while the temperature control tolerance is set narrower to 10° C. from 15° C. and the temperature control region is set as 1495±10° C. Thus, the target value for controlling the temperature of the molten iron is set as low as possible in a region, wherein the stabilized operation of the blast furnace is secured, and furthermore the control tolerance is made narrow, contributing to lowering a fuel ratio.

The region set to control the temperature of the molten iron is determined as Ta to Tb° C. (Ta<Tb), and this is compared with the measured value Tm° C. of the temperature of molten iron obtained by the method according to the Best mode 1. The deviation is sought between the upper and lower limits of the control region and the measured values respectively. The deviation is used to correct the operational conditions to the blast heat governing balance factors so that the temperature of the molten iron will shift into the control region. The principal blast heat governing balance factors are as follows.

① Moisture content in the heat blast blown into at a tuyere,
② Temperature of the heat blast blown into at the tuyere,
③ PCI ratio(pulverized coal injection ratio)
④ Coke ratio(charged coke ratio).

From those blast heat conditions governing factors, the factors are selected to be corrected in consideration of the present condition and inferred later condition in the furnace and operating condition of the blasting furnace, and the correcting quantity is determined. The correcting quantity to the heat level of the blast furnace is separately determined in accordance with the table of tested values and/or values obtained by experience of the operation. For example, in case of Tm<Ta, namely, in case the temperature TM° C. of the molten iron is lower than the temperature target region Ta to Tb° C., the operating factors, to which action is taken, are properly selected from the items such as decreasing the quantity of moisture content added to the hot blast, raising temperature of the hot blast, increasing the PCI ratio and increasing the coke ratio. In case of Tm>Ta, the correcting action is taken to the contrary.

Here, it is preferable that the determination of the heat conditions control factors and the correcting quantity thereof is made on a determination reference taking account of both elements of "level of the heat of the blast furnace" and "transition of the heat of the blast furnace". Namely, in case a correcting action is taken to the heat conditions control factors, the action is taken on the basis of comprehensive decision of the condition of the blast furnace including the decision taking account of the transition of the heat of the blast furnace showing the inclination of raise and fall of the heat of the blast furnace, in addition to the decision of the level of the heat of the blast furnace.

The transition of the heat of the blast furnace is inferred by use of the values of temperature, the information of composition and flowing quantity of gas exhausted from the furnace top and the information of temperature of molten iron, which are measured by the furnace body sensors, namely, the sensors appropriately set to the blast furnace. And the correcting reference made up on the basis of data analysis at the time of operation and operating experience is taken into account as in the case of the level of the heat of the blast furnace. Here, the furnace body sensors are ones conventionally used to control the heat of the blast furnace in operation thereof and are set to various positions of the blast furnace body, including, for example, the temperature sensor buried at the tuyere, the temperature sensor buried at the furnace wall of a shaft position or the gas temperature sensor at the furnace top.

Thus, the determination of the heat governing balance factors and the correcting direction and correcting quantity thereof is made on a correcting action table taking account of both elements of the level of the heat of the blast furnace and the transition of the heat of the blast furnace, and an action is taken to correct the heat of the blast furnace.

The heat of the blast furnace corrected in this way may be further controlled by continuously taking action to the operating condition of the heat governing balance factors, after the correcting action has been taken, on the basis of the temperature information of the heat of the molten iron and the information measured by the furnace body sensors.

According to this method, the measured value of the temperature of the molten iron is controlled to enter the control region, the temperature being lower than the conventional one, and this will realize the following items.
(a) Controlling the concentration of Si in the molten iron to produce the so called low Si molten iron.
(b) Lowering a fuel ratio to carry out the operation of the low fuel ratio.
(a) Production of Low Si Molten Iron The concentration of silicon in the molten iron depends upon the temperature. As the lower is the temperature of molten iron, the more the following reactions will proceed, resulting in lowering the concentration of silicon in the molten iron.

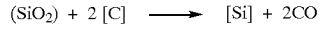

For example, in case the concentration of silicon in the molten iron is controlled in the region of 0.15 to 0.20 wt %, it is preferable that the temperature of molten iron is controlled in the region of 1495±10° C. For the purpose of maintaining the molten iron in such a temperature region, proper correcting action is taken to the level of the heat of molten iron and to the transition of the heat of the molten iron. Namely, adjustment is made of the quantity of the moisture content added to the hot blast which is the heat conditions control factor, of the temperature of the heat blast, of the PCI ratio and of the coke ratio by use of the measured results of the temperature of the molten iron and the results measured by the furnace body sensors on the basis of the action table.

Furthermore, since the operation for producing the low Si molten iron may be carried out in the stabilized condition, loads are reduced of process of de-siliconization and de-phosphorization performed outside of the furnace. Therefore, a low cost and a high content of P ore may be used, as a furnace charged ore.
(b) Operation of Low Fuel Ratio Subsequently described is a method, wherein the fuel ratio is lowered in operating the blast furnace by measuring the temperature of the molten iron flow by using the optical fiber sensor, thereby to lower the control target value of temperature of the molten iron at the operation time, more than the conventional value, namely, to about 1490° C. from the conventional value 1520° C.

According to the method for measuring the temperature of the flow of molten iron in the conventional skimmer, the measured results include defects as a reference for making decision. This is due to outer factors at the initial stage of tapping, that is, the influence of heat loss caused by heat conduction to the tap hole and the heat radiation to an open air while the molten iron passes through the runner. Therefore, the heat action of blast furnace is inclined to lag, and the heat variation between tapping becomes large. Therefore, in the conventional method, for the purpose of avoiding occurrence of abnormality in the operation due to furnace cooling, the control target value of the temperature of the molten iron has been set slightly higher even in the normal operation. In contrast to this, according to the Best mode 1, the temperature of the molten iron is measured by using of the optical fiber immediately after the molten iron pours out at the tapping outlet. By that reason, the measurement is almost free of the influence of the outer factors. As a result, the exact heat of the blast furnace is rapidly obtained, and the lower limit of the molten iron temperature control region is set lower than the conventional one at the normal operation time. For example, the operation is performed while the lower limit of the molten iron temperature control region is set lower by about 30 to 35° C. compared with the measurement of the temperature of molten iron in the conventional skimmer. In this case, the method for controlling the heat of blast furnace is performed by use of the same action table as has been described.

(3) A Second Utilization for Operating the Blast Furnace

The second operation of the blast furnace is to detect the inactivation of a dead man at an early stage. As has been described, in case the dead man is inactivated, the furnace condition is worsened. It is, therefore, required to detect the inactivation of the dead man at the early stages. According to the Best mode 1, it has been found that the inactivation of the dead man may be decided at the early stages by measuring directly and rapidly the temperature of the molten iron poured out at the tap hole by using the optical fiber. Namely, in case the dead man is activate, liquid permeability and gas permeability may be secured, and the normal heat exchange is performed. On the contrary, in case the dead man is inactivate, the temperature of the molten iron is lowered, as has been described, due to the heat loss to the furnace wall which is caused in association with occurrence of eddy-like flow of the molten iron at the dead man. Thus, it has been apparent that the decision of activation and inactivation of the dead man may be more exactly detected by measuring the heat of the molten iron according to the Best mode 1.

This utilization for operating the blast furnace is to prevent the furnace condition from being worsened, as being decided to be of abnormal low temperature. In this operating method, the behavior of temperature of a preceding pouring of the molten iron requiring, for example, approximately 3 to 4 hours and the behavior of temperature of following pouring of the molten iron requiring approximately 3 to 4 hours as well are compared with each other to decide the condition in the furnace. In order to prevent the progress of inactivation of the dead man, in order to prevent the degree of inactivation from further worsening, and in order to recover the activation of the dead man, the operating factors are selected to be corrected, so as to correct the operating condition. The selection of operating factors to be corrected is made, as has been described, by deciding the patterns of the behavior of the temperature of the molten iron of the target pouring and by comparing the patterns of behavior with each other. The method for previously preventing serious worsening of the dead man will be described by way of examples.

(A) Method for Early Detection of the Inactivation of the Dead Man. at the lower part of the furnace and method for preventing the furnace condition being worsened.

At first, the temperature of the molten iron is measured in accordance with the method of the best mode 1. The blast furnace has in general 2 to 4 tap hole provided therewith, and the tap slag is carried out alternately at the two of the tap hole. The other one or two are alternatives or reserves. The first tap hole is opened and a first pouring is started, and the temperature of the molten iron is measured. The measurement is carried out during the pouring period of the molten iron. Actually, one period of pouring requires approximately 3 to 4 hours, and the measurement is carried out 5 to 8 times in one pouring period. In this case, one measurement is continuously carried out in 1 to 20 seconds. One measured temperature value is obtained on the basis of the data given by the continuous measurement. Thus, the transition of temperature of the molten iron during one pouring period is grasped in consideration of the 5 to 8 measured values, and thus, the level and the transition of temperature of the furnace is decided. Subsequently, the first tap hole is closed to terminate the pouring of molten iron, and a second tap hole is opened to start the pouring. The temperature of the molten iron poured at the second tap hole is measured in the same way, and the transition of the temperature of the molten iron during the pouring period is grasped. The same measurements are carried out at the following 3rd and 4th tapping outlets to grasp the heat of the furnace.

The pouring mode is the case wherein the molten iron is poured alternately at the first and second tapping outlets. With this example being used, the method for deciding the activation and inactivation of dead man at the lower part of the furnace will be described.

A comparison is made between the transition of the temperature of a preceding molten iron (at the first tap hole) and the transition of the temperature of the molten iron subsequently poured (at the second tap hole). Thus the transitions of the temperature of the molten iron poured alternately at different two tap hole are compared with each other to grasp and decide subsequently the level and the transition of the temperature of molten iron in consideration of the relative inclinations of the transitions.

Figure 3:
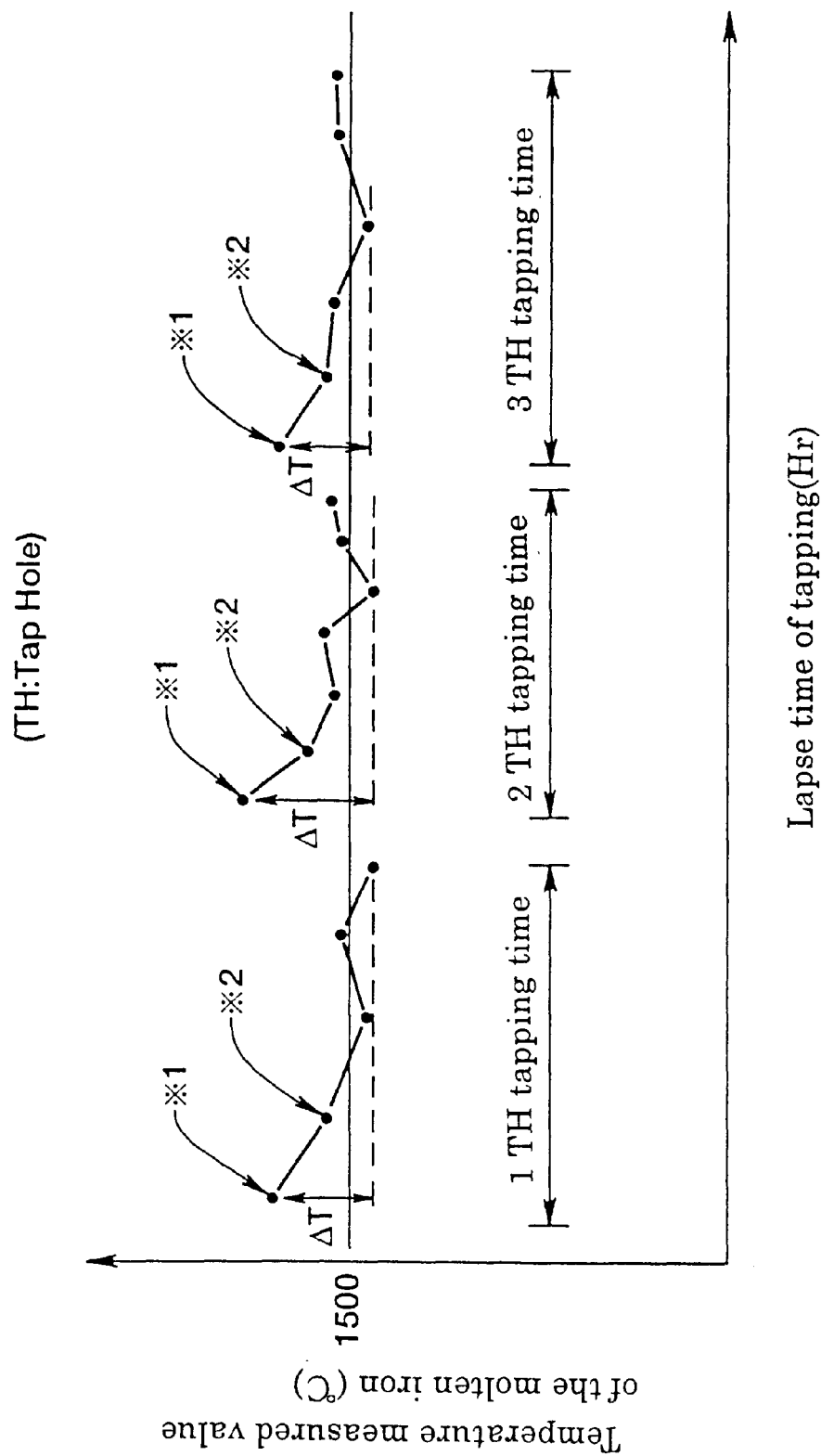
FIG. 3 is a conceptual view of a molten iron temperature transition, which shows one example of determining a state of an activation of the dead man by the Best mode 1 of the present invention.
Figure 4:
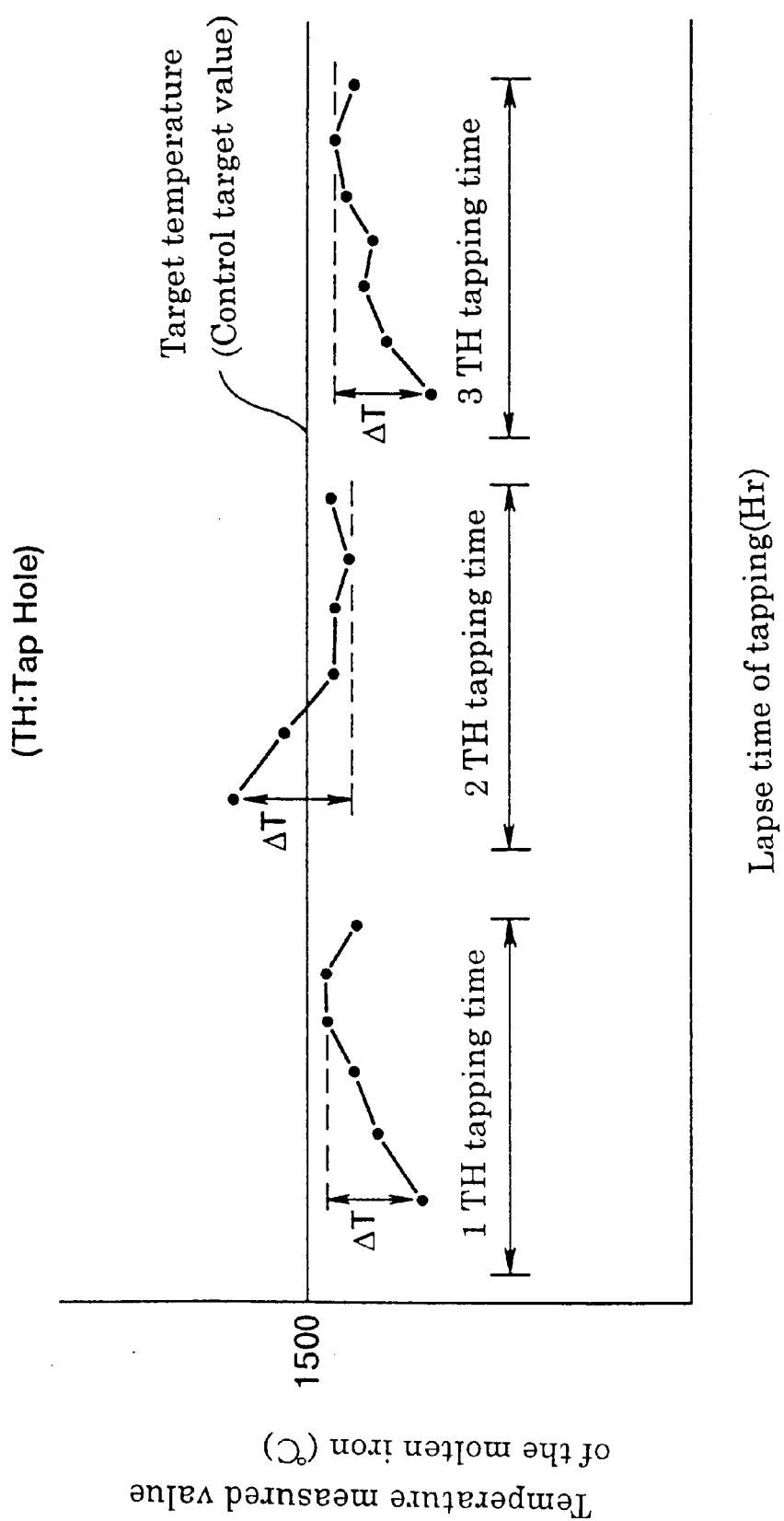
FIG. 4 is a conceptual view of a molten iron temperature transition, which shows one example of determining a state of an inactivation of the dead man by the Best mode 1 of the present invention.

The conception of a reference for deciding the activate and inactivate conditions of the dead man and the operation performed in accordance with the reference will be described by using the examples of the transitions of the temperature of the preceding molten iron and subsequently poured, as shown in FIGS. 3 and 4 respectively.

(a) Decision of Activate Condition of the Dead Man

FIG. 3 diagrammatically shows a conception representing the transition of the temperature of the molten iron for explaining the decision of activation of the dead man by way of example. In FIG. 3, $\Delta T$ is defined as a value that the lowest temperature of the molten iron during the period of pouring is subtracted from the temperature of the molten iron at the initial stage of pouring.

In case the temperature of the preceding poured molten iron is $\Delta T \geq 0$, and the temperature of the molten iron subsequently poured at a different tapping outlet is $\Delta T \geq 0$, the dead man is decided to be activate. This is based on the operating data and operating experience. Here, the size of $\Delta T$ is to be set in accordance with the operating condition of the furnace. It is, however, preferable to normally set a suitable value between 30 and 50° C.

On the other hand, in case the dead man is under the activate condition, the decision as to whether or not the temperature of poured molten iron is in the present control region depends upon the decision as to whether or not the average value of the measured values except the values of two times of measurements at the initial stage of pouring(for example, in FIG. 3, the measured values denoted by *1 and *2) is in the present control region. In case the temperature of the molten iron is in the control region at the normal operation time, the operation is continuously carried out as it is. However, in case the temperature of the molten iron is out of the control region, the heat of the furnace is controlled in accordance with the low Si molten iron operation and the operation of low fuel ratio.

(b) Decision-1 of Inactivate Condition of the Dead Man at the Lower Part of the Furnace and an Action to be Taken Thereto.

FIG. 4 diagrammatically shows a conception representing the transition of the temperature of the molten iron for explaining the decision of inactivation of the dead man, by way of example. As shown in FIG. 4, in case there is pouring representing $\Delta T<0$ alternately occurred following $\Delta T \geq 0$ or representing $\Delta T \geq 0$ alternately occurred following $\Delta T<0$ between the preceding pouring and the following pouring, the dead man at the lower part of the furnace is decided as the inactivate condition. The correcting action to be taken to the heat conditions operation factors is, at first, to rapidly recover the dead man to the activate condition. For this end, the factors to be corrected and the correcting quantity are determined in response to the absolute values, large and small, of minus value $\Delta T$ and the number of taps how $\Delta T$ continues, and the correcting action is taken in accordance with this reference. For example, in case the pouring of $-20°$ C.$\leq \Delta T<0°$ C. continues 3 taps, the quantity of moisture added to the hot blast blown into at the tuyere is decreased in accordance with a predetermined action table. In case the pouring of $\Delta T<-20°$ C. continues 3 taps, the quantity of ores to be charged is decreased in accordance with a predetermined action table. The action is taken to decrease the quantity of ores to be charged so that the furnace may recover to the activate condition.

With the early correcting action being taken, the eddy-like flowing molten iron is suppressed at the furnace bed portion, and the inferior tapping slag due to the inactivation of the dead man is prevented. Thus the serious worsening of the furnace condition may be prevented beforehand.

(c) Decision-2 of Inactivation of the Dead Man at the Lower Part of the Furnace and Action to be Taken Thereto.

In contrast to this, in case the pouring of $\Delta T<0°$ C. continues 3 times, the coke ratio is increased by a predetermined quantity (for example, 30 kg/t) in accordance with a predetermined action table to raise the lower limit target value of the temperature of molten iron(for example, up to 1500° C.), thereby to clean the furnace bottom. Thus, with the early detection of the inactivation of the dead man and the required action being taken, the furnace condition may be recovered while the inactivate condition of the dead man is inconspicuous. Therefore, the furnace condition may be recovered without charging the ore containing $TiO_2$ like ilmenite sintered ores which will prevent damages of the furnace bottom and furnace wall. As a result, the composition of by-produced slag may be used as a raw material of cement by a wind slag treatment.

(d) Prevention of Inactivation of the Dead Man at the Operation Time When the High Quantity of Pulverized Coal Injection (High PCI) is Blowing.

High PCI operation is carried out with the decisions (a) to (c) having been made regarding activation and inactivation of the dead man and the actions having been early taken thereto.

As to the operation blowing high quantity of pulverized coal injection(PCI), so called high PCI operation, the operation is inclined to inactivate the dead man, more easily than the normal operation. The high PCI mentioned herein is meant by the operation, wherein the quantity of pulverized coal injection blown into is 150 kg or more per ton of the molten iron. Namely, in the high PCI operation, the charged coke ratio is decreased more than in the normal operation, and therefore, the coke residence time in the furnace is inclined to increase. As a result, the quantity of powdered coke increases and flows into the dead man portion, and will worsen the permeability of the area. This is considered to invite inactivation of the dead man.

In case the inactivate condition of the dead man is produced in the high PCI operation, the corresponding action extremely lagged will make it impossible to inject the pulverized coal, allowing the heat of the furnace to remarkably lower and inviting a bad condition of the furnace due to the abnormal low temperature. Therefore, at the time of high PCI operation, it is significant to make earlier detection of decrease of temperature level of the furnace which is caused by decreasing the temperature of the molten iron. In the Best mode 1, the temperature of the molten iron may be exactly and rapidly grasped, and therefore, the inactivate inclination of the dead man may be easily detected by the information indicating the decrease of the temperature of the molten iron. Thus, the temperature will not lower to the lower limit of abnormal control, thereby making it possible to prevent the furnace condition from being worsened. Moreover, by using the measured information of the molten iron running out of the tap hole, the control target value of the temperature of the molten iron at the normal operation time may be set considerably lower than the measured value of the molten iron in the conventional skimmer. This will contribute to the decrease of the fuel ratio all the more.

In the high PCI operation, the target value of the molten iron temperature is set higher (for example, a degree of base +10° C.) than in the normal furnace operation such that the temperature of the hot blast blown into at the tuyere may be higher. The temperature during pouring of molten iron is measured by the method described in the Best mode 1. Furthermore, the mode of temperature information to be grasped is the same as described at (b) and (c). And in case a sign of inactivation of the dead man as described by way of example at (b) and (c) has been detected, action is rapidly taken to activate the dead man. The sort of operating factors to be corrected by the action includes, for example, decrease of the quantity of pulverized coal to be injected into, decrease of the quantity of moisture added to the heat blast injected into at the tuyere, raise of the temperature of heat blast or use of high energy coke. The correcting quantity is determined on the basis of operation experience inherent to the blast furnace and special knowledge.

EXAMPLE 1
Production of Low Si Molten Iron

The temperature of the molten iron pouring out at the tap hole was controlled to a low temperature by using the optical sensor unit and the temperature measuring device as shown in FIGS. 1 and 2 respectively.

Figure 5:
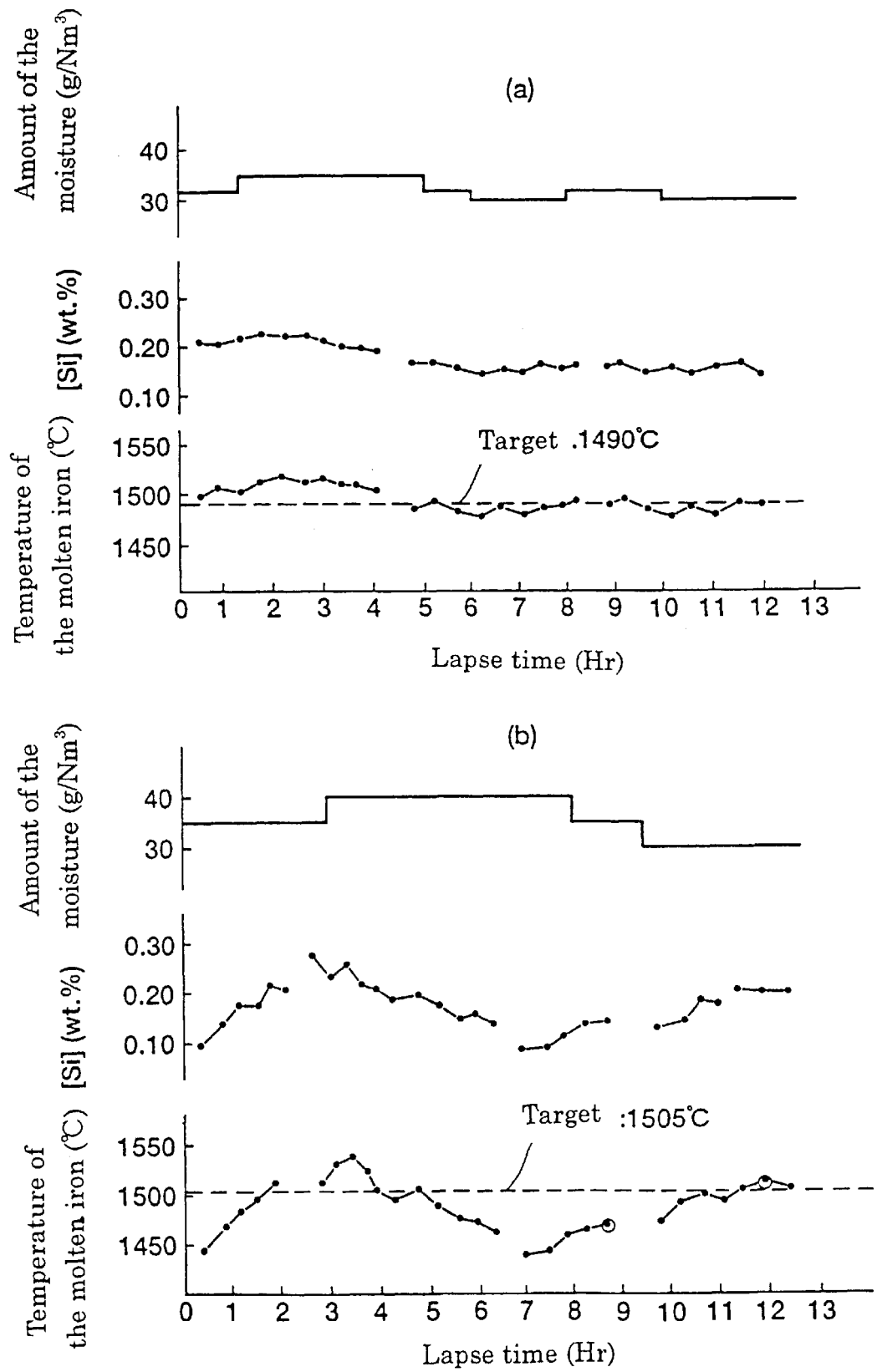
FIG. 5 is a graph showing changes with time of the measurements of the molten iron temperature, the Si concentration of the molten iron and the amount of the moisture added to hot blast by the Best mode 1 of the present invention.

A wire-like optical sensor unit 6 was inserted into the flow of the molten iron 2 pouring out of the tap hole while the optical sensor unit 6 was slidingly moved in the guide pipe 15 of an inner diameter 6 mm and an outer diameter 10 mm, the wire-like optical sensor unit 6 being of double structure having a crude line of the optical fiber 7 made of silica glass of diameter 125 $\mu$m and covered with an inner stainless steel pipe of an outer diameter 1.2 mm, an inner diameter 0.8 mm and a thickness 0.2 mm and an outer stainless pipe of outer diameter 3.6 mm, inner diameter 3.0 mm and thickness 0.3 mm. The supplying speed of the optical sensor unit 6 was set as 400 mm/sec. The temperature measuring time was about 10 to 20 seconds per once, and in the meantime the temperature was continuously measured. The pouring time per once was 3 to 4 hours, and in the meantime the temperature of the flow of molten iron 2 was measured 8 to 10 times. The target value of the temperature of molten iron was set as 1490° C., and the temperature of molten iron was controlled while moisture content in the hot blast was adjusted. Regarding the example, FIG. 5(a) shows the variations, with lapse of time, of 3 times of measured values of temperature of the molten iron, of measured concentration of Si in the molten iron and of quantity of moisture content added to the hot blast. As the temperature of molten iron was stabilized and controlled to be low, the concentration of Si in the molten iron was in the region 0.15 to 0.23 wt %, and the average value was 0.18 wt %. Thus a stabilized molten iron of low Si was produced.

Comparative Example 1
Production of Low Si Molten Iron

As the conventional method for controlling the temperature of molten iron, the temperature of the molten iron was measured by an immersion-type thermometer in skimmer. On the basis of the measured value, the moisture content in the molten iron was adjusted such that the temperature of the molten iron may be controlled to the set target value 1505° C. Regarding the conventional method, FIG. 5(b) shows in skimmer the variations, with lapse of time, of 4 times of measured values of temperature of the molten iron, of measured concentration of Si in the molten iron and of quantity of moisture content added to the hot blast. According to the conventional method, the concentration of Si in the molten iron was considerably varied, and a stabilized molten iron of low silicon was not produced. Namely, the concentration of Si in the molten iron is varied between 0.10 and 0.30 wt %. It can be seen that the true temperature of the molten iron was considerably varied up and down according to the conventional method.

EXAMPLE 2
Operation of Low Fuel Ratio

The temperature of the molten iron was controlled to lower temperature by using the information obtained by using the optical sensor unit and the temperature measuring device for measuring the temperature of molten iron pouring out of the tap hole as shown in FIGS. 1 and 2 respectively. The optical sensor unit and temperature measuring device and the method for using them were same as in the example 1, wherein the optical sensor unit was inserted into the flow of the molten iron pouring out of the tap hole to measure the temperature of the molten iron. The target value of temperature of the molten iron was set to 1485° C., and at first, the quantity of moisture content to be added to the hot blast was adjusted to control the temperature of the molten iron. Thus, on the basis of inference that the heat conditions might be sufficiently held constant, the target value of temperature of the molten iron at the constant condition was continuously held as it was 1485OC, and the operation was continued by using the coke ratio as a heat governing balance factor.

During the testing period of this embodiment, the heat conditions was held constant.

Here, the discrimination of constant condition and inconstant condition was made as follows. Namely, at first, the present heat level of furnace and the transition of the heat conditions were inferred. The inference of the heat level of the furnace was made from the measured temperature level of the furnace while the inference of transition of heat conditions was made from the information obtained by the sensors provided at various parts of the blast furnace body, namely, from the information obtained in a special consideration of the temperature information from the sensor buried at the tuyere, the transition of a gas from the furnace top, the transition of an analyzed value of the furnace top and the transition of the concentration of Si in the molten iron. Subsequently, a certain number of ranks were predetermined in reference to the temperature area to which the set target values of the heat conditions level and the heat conditions transition belong, and the ranks were sought to which the present heat level of the furnace and the transition of heat of the furnace belong respectively. A matrix(action matrix) was made up of the level ranks and the transition ranks of heat of the furnace, and a corresponding position was sought on the matrix to infer the present heat of the furnace. It was observed which of the constant region and inconstant region the present heat of the furnace corresponded to on the matrix. The determination of constant region or inconstant region was made by comprehensively taking account of the knowledge of experts, the empirical knowledge of blast furnace operators and the data of past actual results of operations.

Table 1 shows the operation results obtained by the operation of the low fuel ratio, wherein the target value of temperature of the furnace was set to lower temperature. It is noted that the operation results of normal operation at the same blast furnace are shown together as the compared example.

TABLE 1

|  | Example 2 | Comparative example 2 |
| --- | --- | --- |
| Number of tapping (tap) | 18 | 18 |
| Target value of molten iron temperature (° C.) | 1485 | 1510 |
| Actual value of molten iron temperature (° C.) | 1480 to 1496 | 1480 to 1515 |
| Coke ratio (kg/t) (average value) | 398 | 401 |
| PCI ratio (kg/t) (average value) | 102 | 102 |
| Productivity (t/m3) | 2.0 | 2.0 |
| Fuel ratio (kg/t) | 500 | 503 |

According to the test results, with the operation of the low fuel ratio of the example, the fuel ratio was decreased by 3 kg/t. Furthermore, the variation width of the temperature of molten iron was suppressed lower in the Example 2 than in the Comparative Example 2. Thus, more stabilized control of the heat conditions was realized.

As mentioned above, according to the Best mode 1, it is possible to carry out the operation of the furnace in a stable condition. Since the temperature of the molten iron may be made narrower than in the conventional operation, the target value also may be lowered. Furthermore, occurrence of abnormality in the operation, by the inactivation of the dead man, may be prevented in bud. Thus, the high PCI can be operated. The stabilization of the furnace condition is facilitated, so that production cost of the molten iron can be reduced. It is possible to offer the operation of the blast furnace with industrially useful effects.

Best Mode 2

The inventors thought it necessary to develop a method capable of continuously correctly measuring the temperature of the molten iron with high precision and as a short time delay as possible. As such a method, the inventors studied a new method capable of measuring the molten iron, in a stable condition, injected from the tap hole during tapping before a temperature drop occurs. As a result, it was found that such a method can be realized by using an optical fiber sheathed with a metallic tube, i.e., the temperature of the molten iron is measured by using a wire-shaped optical sensor unit comprising the optical fiber reinforced with a metallic tube to provide rigidity and appropriately designed corresponding to the state of the molten iron flow measured.

It was also found that backup of information of various sensor values by temperature information obtained by the new molten iron measurement method permits the more precise inference of heat conditions transition.

The first method for controlling a heat conditions of a blast furnace comprising the steps of:

providing a heat conditions estimation model formed by using an empirical rule and a expert knowledge for the operation of the blast furnace;

inferring a heat conditions level and a heat conditions transition by using a heat conditions estimation model, on the basis of the obtained temperature information, to obtain a result of the inference of the heat conditions;

taking an action of correcting an operation factor of the blast furnace by using the empirical rule and the expert knowledge for the operation of the blast furnace, on the basis of the obtained temperature information, to control the temperature of the molten iron, wherein, the heat conditions estimation model comprises a knowledge base for the heat conditions level inference including a measurement information on the molten iron temperature obtained from the optical fiber, and a knowledge base for the heat conditions transition inference including a measurement information on the molten iron temperature obtained from a optical fiber and a measurement information from a blast furnace sensor.

The second method for controlling a heat conditions of a blast furnace comprising the steps of:

providing the heat conditions estimation model formed by using the empirical rule and the expert knowledge for the operation of the blast furnace;

inferring the heat conditions level and the heat conditions transition by using the heat conditions estimation model, on the basis of the obtained temperature information, to obtain the result of the inference of the heat conditions;

displaying the results of inference of the heat conditions by display means;

taking an action of correcting an operation factor of the blast furnace by using the empirical rule and the expert knowledge for the operation of the blast furnace, on the basis of the obtained temperature information, to control the temperature of the molten iron.

The third method for controlling a heat conditions of a blast furnace comprises:

automatically taking the action of correcting an operation factor of the blast furnace by using an artificial intelligence system to control the temperature of the molten iron;

the artificial intelligence system comprising the steps of;
a step of providing a heat conditions estimation model formed by using an empirical rule and expert knowledge for an operation of a blast furnace;
a step of inferring a heat conditions level and a heat conditions transition by using the heat conditions estimation model, on the basis of the obtained temperature information, to obtain the result of the inference of the heat conditions;
a step of providing a heat conditions correcting model formed by using the empirical rule and the expert knowledge for the operation of the blast furnace;
a step of taking the action of correcting an operation factor of the blast furnace by using the heat conditions correcting model, on the basis of the inference of the heat conditions, wherein the heat conditions estimation model comprises;
the knowledge base for a heat conditions level inference including the measurement information on the molten iron temperature obtained from the optical fiber, and
the knowledge base for heat conditions transition inference including the measurement information on the molten iron temperature obtained from the optical fiber and the measurement information from a blast furnace sensor.

The Best mode of the present invention is described below.

A method of controlling blast heat conditions of the present invention basically comprises the steps of measuring the temperature of a molten iron tapped through a tap hole, and taking the action of correcting an operation factor of a blast furnace by the operator based on the obtained temperature information, or the action of correcting an operation factor of the blast furnace by using an artificial intelligence system based on the obtained temperature information.

The most characteristic of the present invention lies in the position and method of measuring the temperature of the molten iron. As the position of measurement of the molten iron temperature which is considered as representative of the heat conditions level, it is preferable to use the temperature position nearest to the temperature of the molten iron in the furnace where the molten iron is injected from the tap hole during tapping. However, it is difficult to continuously accurately measure, in a stable state, the temperature of the molten iron accompanied with a violent flow. However, this difficulty is removed by inserting the optical fiber sheathed with a metallic tube into the molten iron flow and detecting the radiated light of the molten iron, which is emitted from the tip of the optical fiber.

The structure of the optical fiber sheathed with a metallic tube, which is used in the Best mode 2, is the same as in FIG. 1 of the Best mode 1. A temperature measurement apparatus used in the Best mode 2, is the same as in FIG. 2 of the Best mode 2.

Besides the information on the hot temperature described above a measurement information such as the embedded tuyere temperature a information of various sensor (i.e., a blast furnace sensor, a furnace body sensor) values, the gas temperature at the furnace top, the analytical values of the gas at the furnace top, and the Si concentration and S concentration of the molten iron, and the like are collected. The heat conditions is inferred and controlled by using the thus-obtained various types of information.

Figure 6:
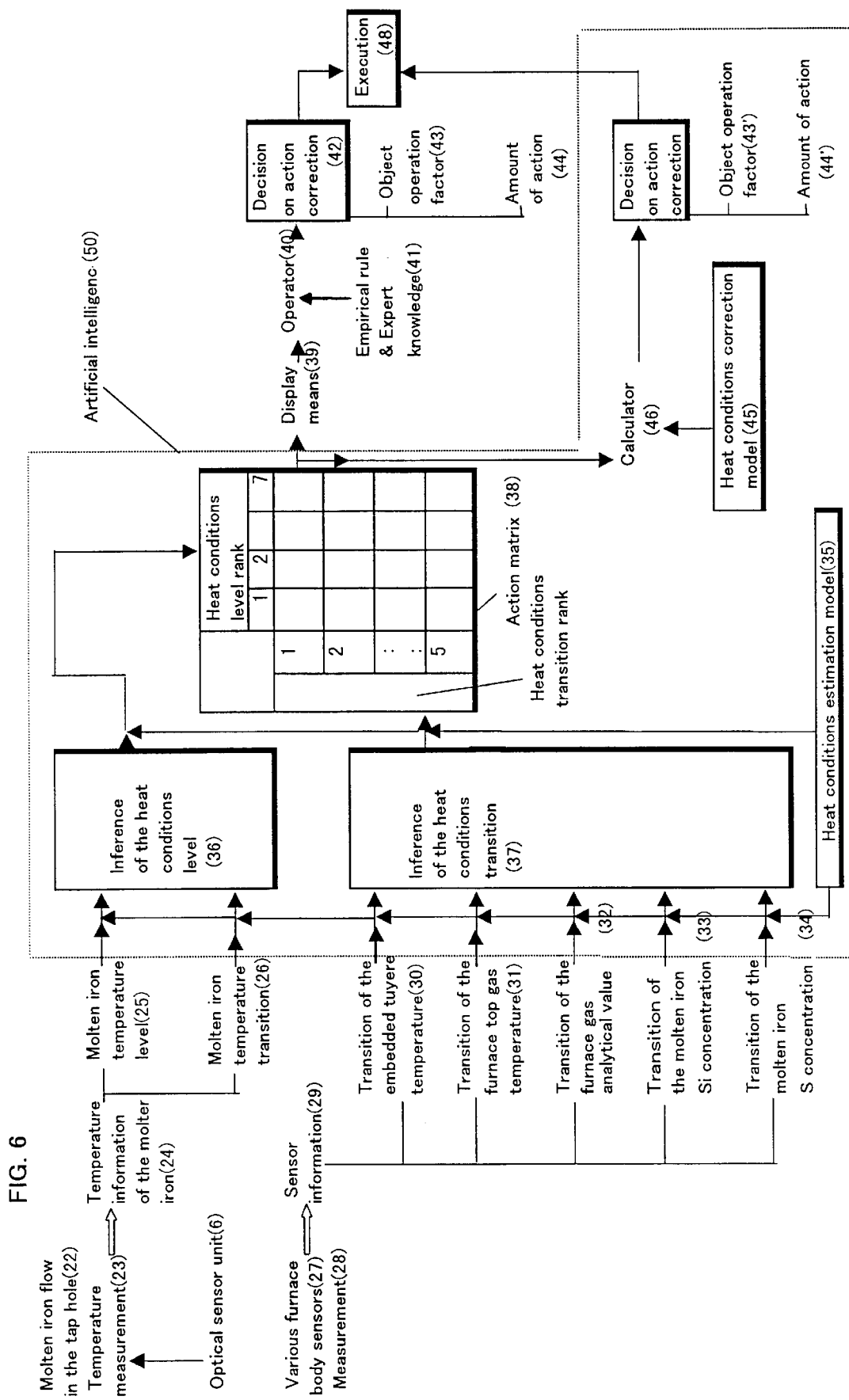
FIG. 6 is a flowchart of heat conditions control by the Best mode 2 of the present invention.

FIG. 6 shows a flowchart of heat conditions control of the present invention. An example of the method of controlling heat conditions of the present invention will be described with reference to the flowchart.

⑥ The wire-shaped optical sensor unit (6) containing the optical fiber is inserted into a molten iron flow (22) in the tap hole of a blast furnace for the predetermined time to obtain temperature information (24) of the molten iron by temperature measurement (23). The temperature measurement of the molten iron is continuously carried out in such a manner that the tapping time of about 3 to 4 hours is divided into sections at intervals of 20 minutes, and the average value of one section is considered as the representative temperature of the molten iron in this section, and determined as the molten iron temperature level (25) in this section. The change in the molten iron temperature from the section just before this section to this section is considered as the molten iron temperature transition (26) in this section.

② On the other hand, predetermined characteristic values are measured (28) by various furnace body sensors (27) to obtain sensor information (29). The measurement object and the measurement frequency depend upon the type of the sensor used. For example, with the embedded tuyere sensor, the embedded tuyere temperature is obtained once a minute from the thermocouple embedded in the furnace body near the tuyere. In this way, on the bases of the information from each of the sensors, transition (30) of the embedded tuyere temperature, transition (31) of the furnace top gas temperature, transition (32) of the furnace gas analytical value, transition (33) of the molten iron Si concentration and transition (34) of the molten iron S concentration are obtained.

Figure 7:
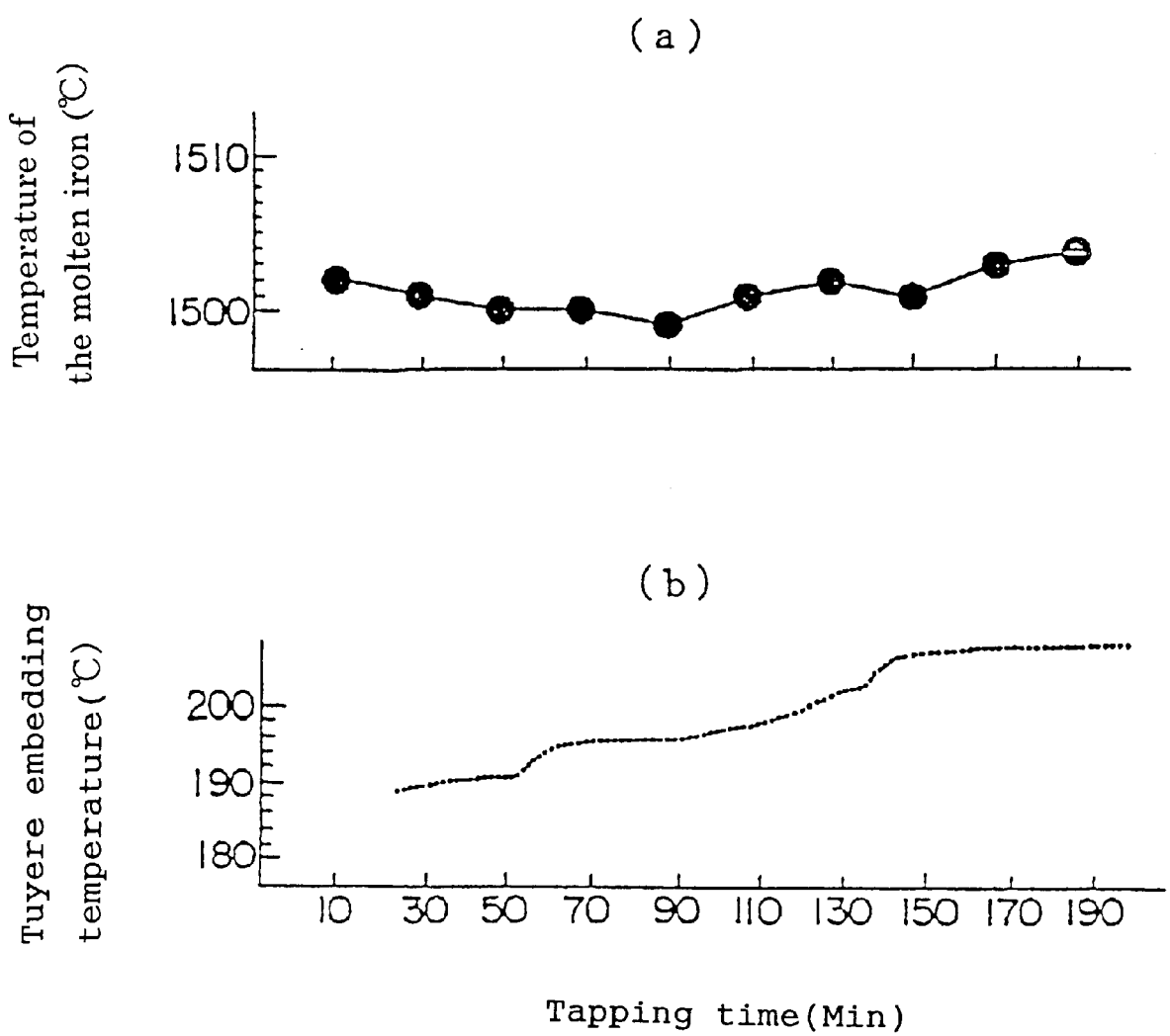
FIG. 7 is a graph showing an example of measurement results of the molten iron temperature and the embedded tuyere temperature measured by the Best mode 2 of the present invention.

③ FIG. 7(a) shows an example of measurement results of the molten iron temperature, and FIG. 7(b) shows an example of measurement results of the embedded tuyere temperature. In the method of measuring the temperature of the molten iron according to the present invention, the temperature measurements of the molten iron fall in the range of ±5° C. A heat conditions estimation model (35) for a blast furnace is previously formed by using empirical rule and/or expert knowledge for operations of the blast furnace. On the basis of the temperature level, the temperature transition, etc., which are obtained above in (1) and (2), the heat conditions level (36) and heat conditions transition (37) are inferred by using the heat conditions estimation model (35). On the basis of the temperature level, the temperature transition, etc. obtained above in (I) and (J), the heat conditions level (36) and heat conditions transition (37) are inferred by using the heat conditions estimation model (35) for the blast furnace formed by using the empirical rule and/or expert knowledge for operations of the blast furnace.

④ An action matrix (38) is formed by using the heat conditions estimation model (35) on the basis of the results of inference. The action matrix is means as a decision criterion for evaluating the present level of heat conditions, inferring future heat conditions transition, bringing the heat conditions level near the target level and maintaining the target heat conditions level.

(④-a) Inference of the heat conditions level: In temperature measurement of the molten iron, since the molten iron injected from the tap hole is measured, the measured temperature is considered as substantially the same as the molten iron in the furnace appears. In addition, since the measurement data has high reliability, and continuous measurement is possible, the measurement interval can also be shortened. Therefore, the thus-obtained temperature level of the molten iron is sufficiently considered as the furnace level with high correctness and precision. Thus, the thus-obtained temperature of the molten iron is used as the present heat conditions level.

(④-b) Inference of the heat conditions transition: The heat transition determined from data of each sensor is weighted by the method previously set for each sensor, and the data of the sensors are integrated to determine the heat conditions transition. The heat conditions transition is corrected by using transition of the molten iron temperature level to obtain future heat conditions transition. In this way, the data of each sensor is used as a standard for heat conditions transition because a change in heat conditions is detected earlier by the value of each sensor.

(④-c) On the basis of inference of the thus-obtained present heat conditions level and heat conditions transition, each of the present heat conditions level and heat conditions transition is ranked. For example, the ranks of the heat conditions level are set to a total of 7 ranks at intervals of a molten iron temperature of 10° C., which are centered at a rank including the target heat conditions level and comprises 3 ranks each above and below the center rank. The ranks of heat conditions transition are set to a total of 5 ranks at intervals of a heat conditions gradient of 10° C./min., which are centered at a rank including a gradient of zero and comprises 2 ranks each above and below the center rank.

(④-d) The position corresponding to the heat conditions state including the present heat conditions level and heat conditions transition is determined in the thus-formed action matrix (38).

⑤ Next, in order to control the present heat conditions evaluated by the corresponding position in the action matrix to the target heat conditions, the action of correcting an operation factor of the blast furnace is make. This correction action is divided into two cases including a case in which the information of the action matrix is displayed by display means (39), and the operator (40) carries out the action on the basis of the information displayed by the display means, and a case in which the information of the action matrix is input in an artificial intelligence system (49) to automatically perform the action by mechanization.

⑥ In the case described above in ⑤ in which the operator performs the correction action, an object operation factor (43) of the action and the amount of action (44) are determined (42) by utilizing the empirical rule and/or expert knowledge (41) for operations of the blast furnace. While in the case in which the correction action is mechanically performed by the artificial intelligence system, an object operation factor (43') of the action and the action amount (44') are determined (47) by a calculator (46) according to the heat conditions correction model (45) previously formed by using the empirical rule and/or expert knowledge for operations of the blast furnace. The thus-determined correction action is executed to control the molten iron temperature to be kept at the target value for controlling the heat conditions.

⑦ Main factors which determine the heat conditions include the moisture in hot blast, the temperature of hot blast, the PC ratio (the ratio of the pulverized coal brown in), the coke ratio (the ratio of the coke loaded), and the like. However, in order to adjust the temperature of the molten iron, it is convenient to control the moisture of hot blast. The temperature of the molten iron may be increased by decreasing the amount of the steam added.

The present invention will be described in further detail below with reference to examples.

A blast furnace was operated by the method of controlling heat conditions of the present invention using the molten iron temperature measurement apparatus shown in FIG. 1 and the optical sensor unit for measuring molten iron temperature, which had the structure shown in FIG. 2. The flow of heat conditions control is as shown in FIG. 6.

The optical sensor unit 6 had a wire-shaped double structure in which a quartz glass optical fiber 1 as an element wire having a diameter of 25 $\mu$m was sheathed with a stainless sheath tube (inner tube) having an outer diameter of 1.2 mm, an inner diameter of 0.8 mm, and a thickness of 0.2 mm, and a stainless sheath tube (outer tube) having an outer diameter of 3.6 mm, an inter diameter of 3.0 mm, and a thickness of 0.3 mm. The optical sensor unit 6 was inserted into an injected molten iron flow 8 under tapping while being slipped in the guide pipe 15 having an inner diameter of 6 mm and an outer diameter of 10 mm. The feed speed of the optical sensor unit 6 was set to 400 mm/sec. The time required for one temperature measurement was about 10 to 20 seconds so that the temperature was continuously measured for this time. The time of one tapping was about 3 to 4 hours so that the temperature of the molten iron flow 8 was measured 8 to 10 times in this tapping time. The target value of the temperature of molten iron was 1505° C., and the temperature of the molten iron was controlled by adjusting the moisture in hot blast.

Figure 8:
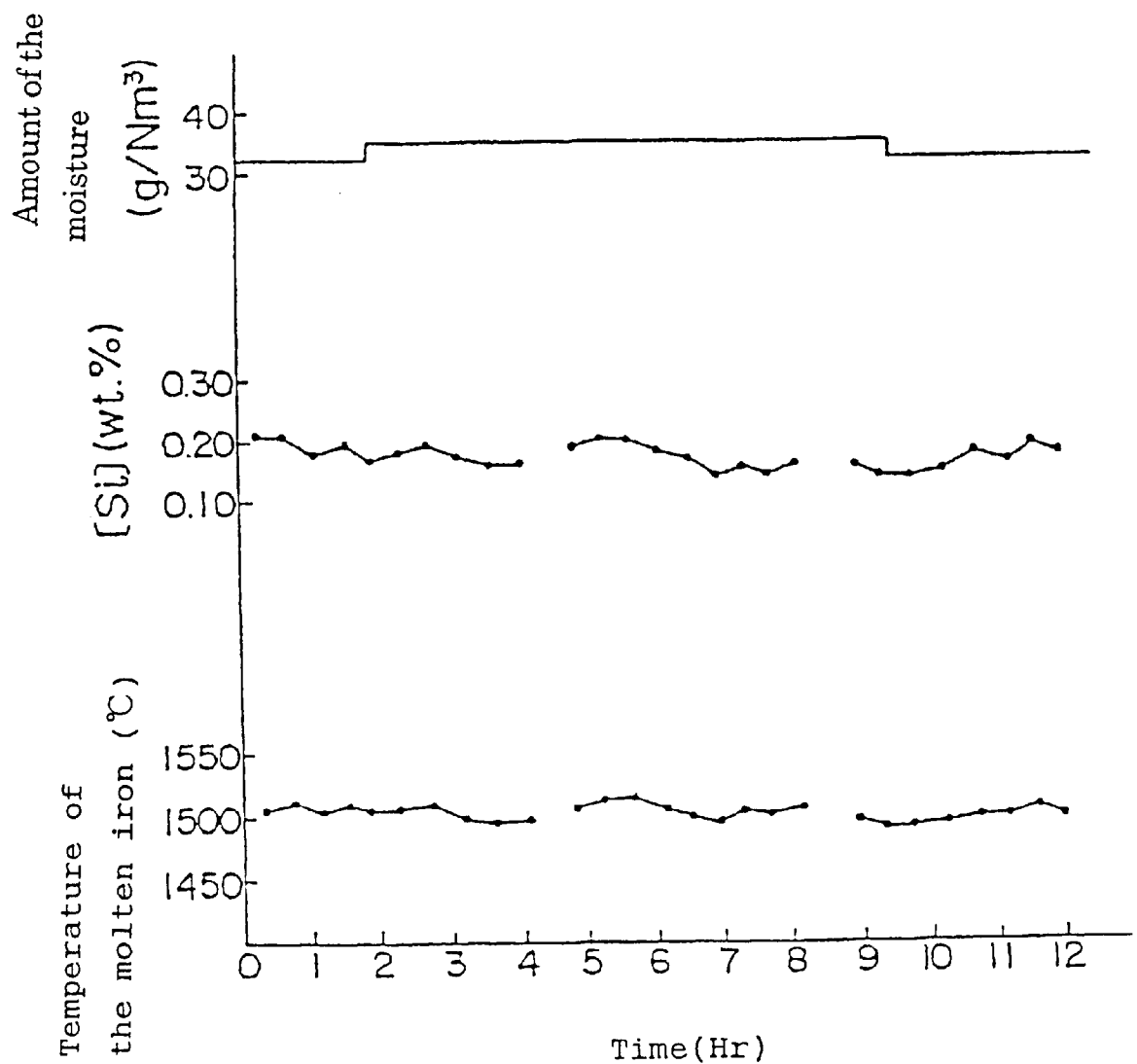
FIG. 8 is a graph showing changes with time of the measurements of the molten iron temperature, the Si concentration of the molten iron and the amount of the moisture added to hot blast by the Best mode 2 of the present invention.

(Test Result-1):

FIG. 8 shows changes with time of the measurements of the molten iron temperature, the Si concentration of the molten iron and the amount of the moisture added to hot blast in three times of tapping. Since the temperature of the molten iron was controlled to low values in a stable condition, the Si concentration of the molten iron was in the range of 0.15 to 0.21 wt %, resulting in the stable production of a low-silicon molten iron having an average Si concentration of 0.18 wt %.

On the other hand, as a conventional method of controlling the temperature of a molten iron, the temperature of the molten iron was measured by an immersion type thermometer in the skimmer, and on the basis of the measured value, the moisture of hot blast was adjusted to control the temperature of the molten iron to the set target value of 1505° C.

Figure 9:
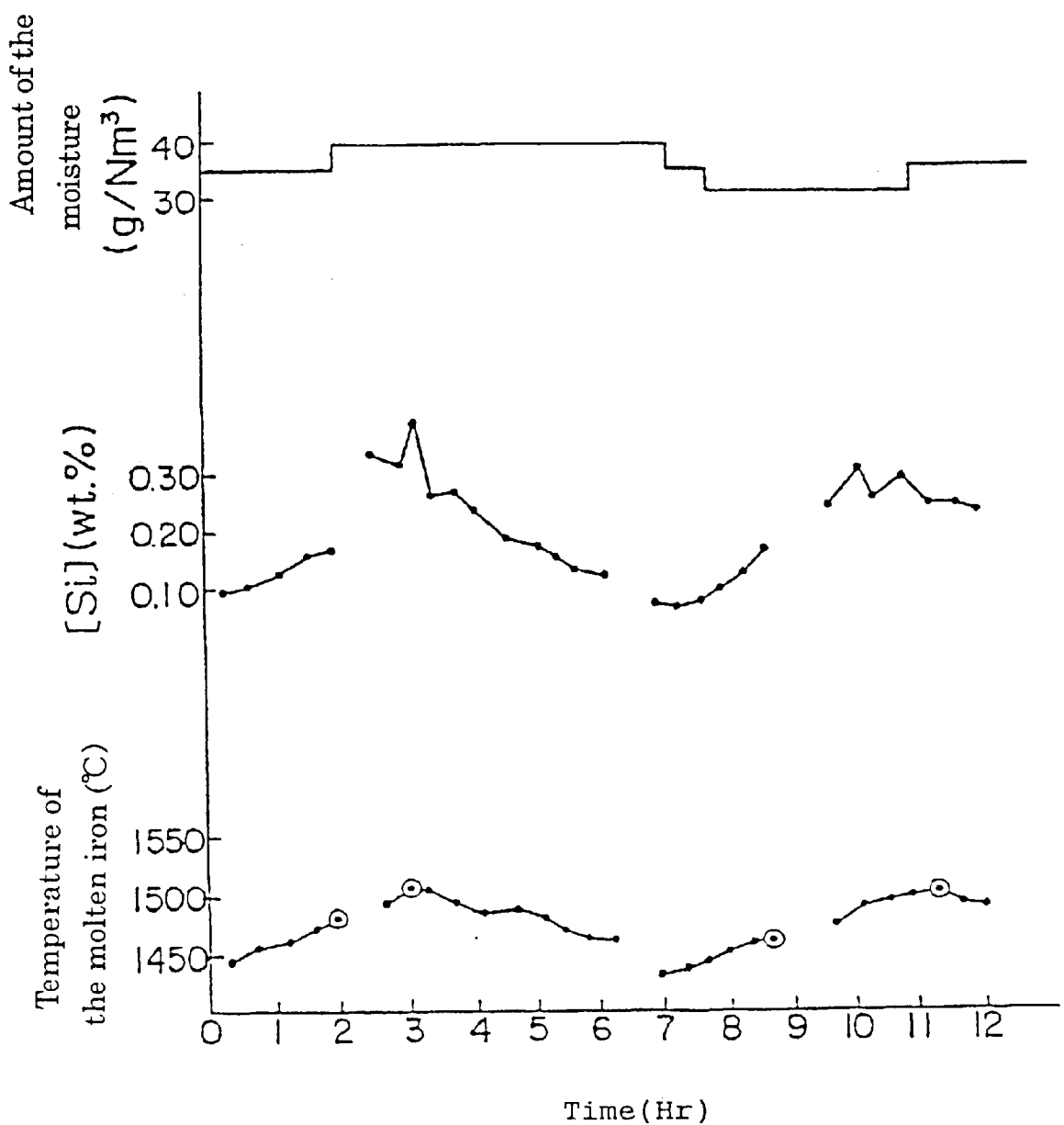
FIG. 9 is a graph showing changes with time of the measurements of the molten iron temperature, the Si concentration of the molten iron and the amount of the moisture added to hot blast by a conventional method.

FIG. 9 shows changes with time of the measurements of the molten iron temperature in the skimmer, the Si concentration of the molten iron, and the amount of the moisture added to hot blast in four times of tapping in the conventional method. In the conventional method, the Si concentration of the molten iron greatly changed, thereby making impossible the stable production of a low-silicon molten iron. The Si concentration of the molten iron varied between 0.10 to 0.30 wt %. It is thus found that the actual temperature of the molten iron greatly varies.

Figure 10:
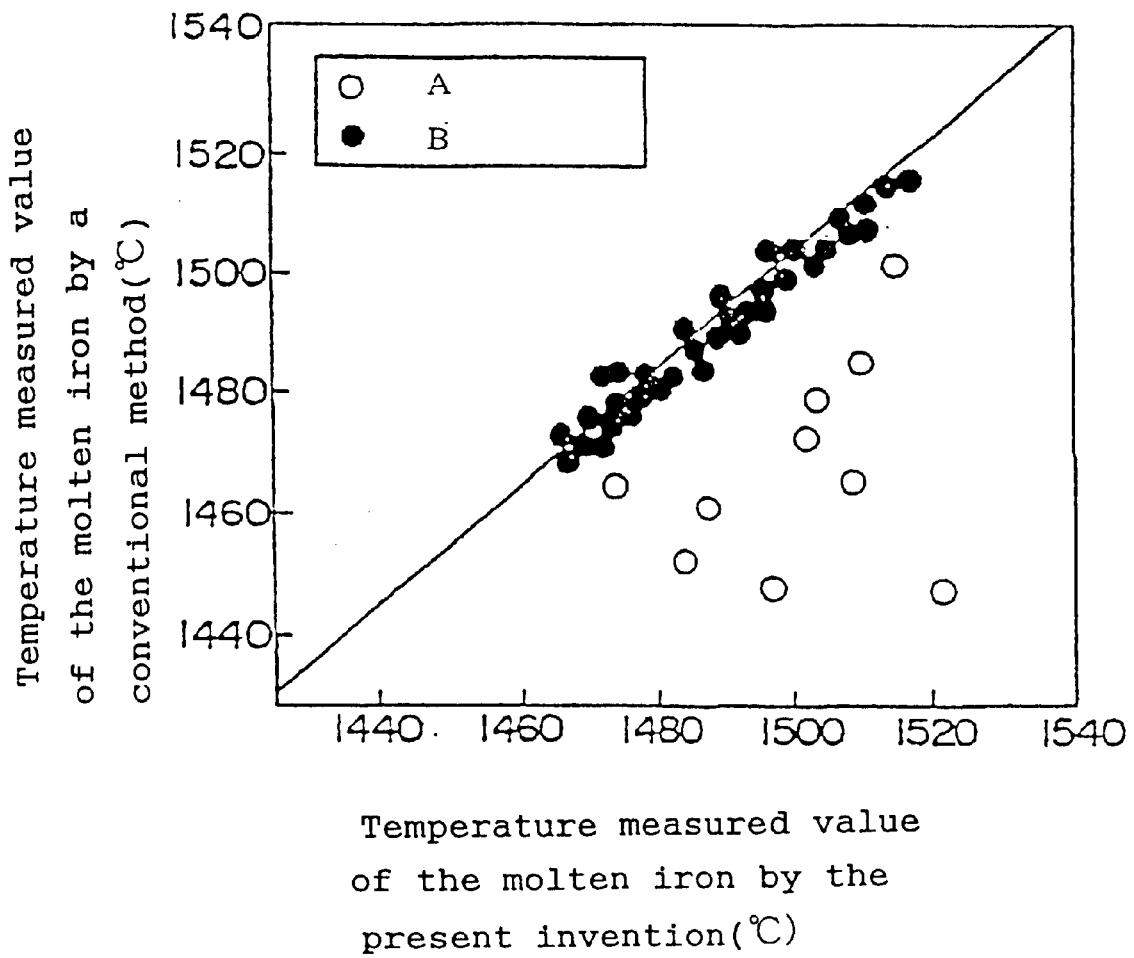
FIG. 10 is a graph showing the correlation between the measurements of the molten iron temperature by the Best mode 2 of the present invention and the measurements of the molten iron temperature by a conventional method, in which data is shown in layers of the initial stage and the later stage of tapping.
Figure 11:
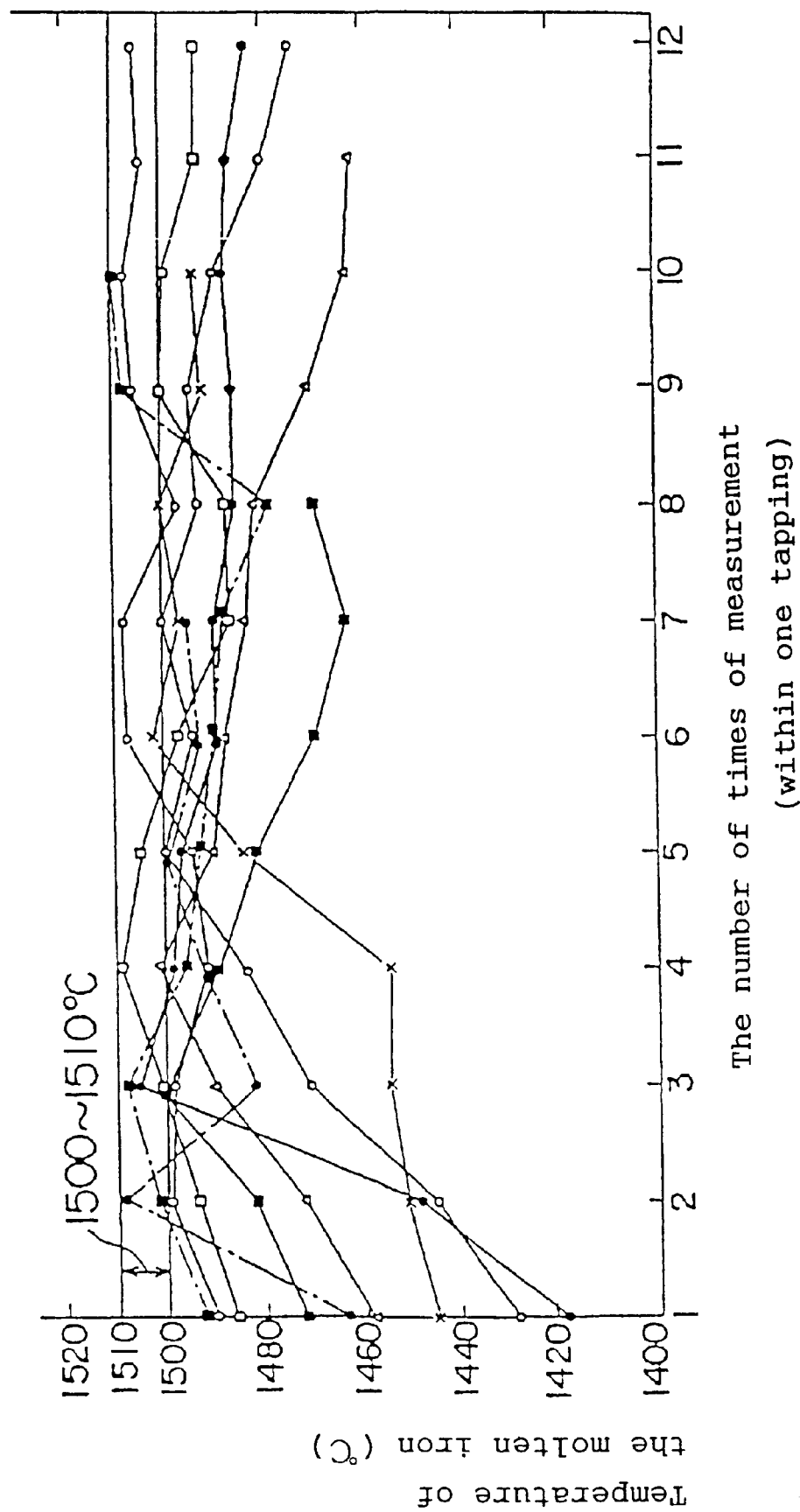
FIG. 11 is a graph showing changes in the measurements of the molten iron temperature measured by a conventional method.
Figure 12:
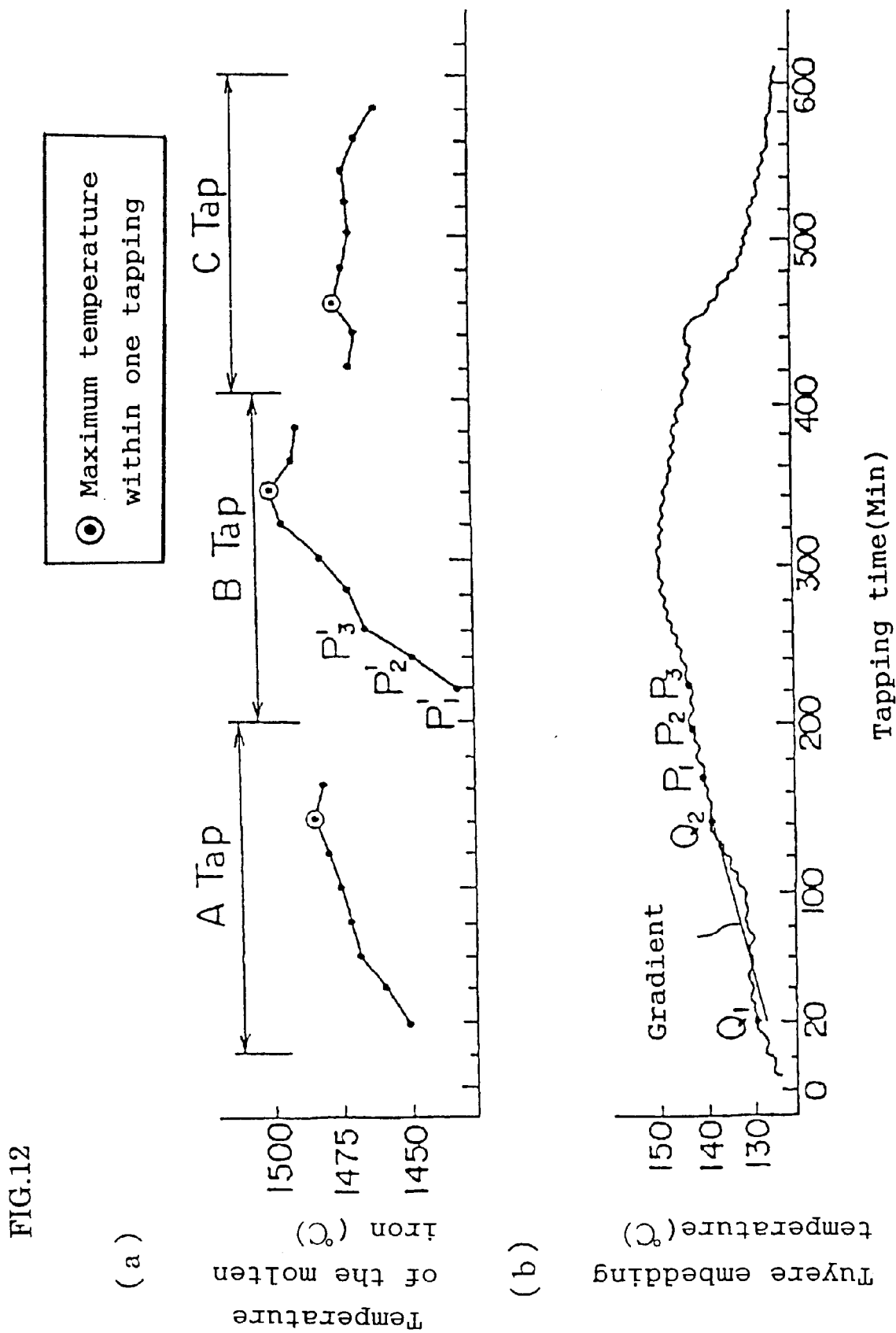
FIG. 12 is a graph showing an example of correspondence between the measurement results of the molten iron temperature and the tuyere embedding temperature measured by a conventional method in the period of continuous three times of tapping.

(Test Result-2):

An operation test was carried out by seven times of tapping while controlling heat conditions by the method of the embodiment of the present invention, and an operation test was carried out by seven times of tapping while controlling heat conditions by measuring the temperature of a molten iron in the skimmer. In FIG. 10, the correlation between the measurements of the molten iron temperature obtained by the method of the present invention, and the measurements of the molten iron temperature obtained by the conventional method is shown in layers by data (marked with ○ in the figure) in the initial stage of tapping and data (marked with ● in the figure) in the period in which the measurement of the molten iron temperature by the conventional method shows a value close to the highest temperature in a later stage of tapping.

The above test results also indicate the following matters:

In the conventional method of controlling heat conditions in an operation of a blast furnace, it is difficult to rapidly correctly infer the tapping temperature with high precision. Therefore, in order to previously prevent a trouble in the operation from occurring due to an abnormal decrease in heat conditions, the control standard for the tapping temperature is set to a value higher than the temperature level necessary for actual operations to control the heat conditions to a higher level on the safety side. When the temperature of the molten iron is controlled to a higher level, the amount of the coke used as fuel must be increased, thereby causing the problem of increasing the coke ratio.

In addition, as the molten iron temperature increases, reaction of transition of Si into the molten iron represented by the following reaction formulae proceeds to increase the Si concentration of the molten iron:

(1)

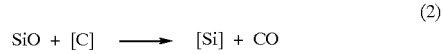
(2)

wherein:
Equation (1): Reaction of Si transition into the molten iron by slag-metal reaction
Equation (2): Reaction of Si transition into the molten iron through SiO gas As the Si concentration of the molten iron increases, the consumption of lime used as a flux in refining of a molten iron as a raw material in the next steel making process increases, thereby decreasing the Fe yield due to an increase in the amount of steel slag, and causing the problem of increasing the amount of steel slag.

On the other hand, the method of controlling heat conditions of the present invention is capable of controlling the heat conditions, in a stable condition, thereby decreasing the control standard for the molten iron temperature to the target temperature level necessary for actual operations. Therefore, there is no need to use excessive coke. Also the temperature of the molten iron can be controlled to a lower level, and thus the Si concentration of the molten iron can be stabilized in the range of as low as 0.15 to 0.21 wt %, for example. It is also possible to prevent the occurrence of an operation trouble due to an abnormal decrease in heat conditions.

As described above, the present invention can control the molten iron temperature, in a stable condition. Therefore, it is possible to promote stabilization of furnace conditions and decrease the production cost of a molten iron. Since the molten iron temperature can be controlled in a narrow range, the control target value of the molten iron temperature can be set to a low value. It is thus possible to produce a low-silicon molten iron, in a stable condition. Furthermore, it is possible to prevent the occurrence of an operation trouble due to an abnormal decrease in heat conditions. The present invention can provide such a method of controlling a blast furnace, and exhibits industrial advantageous effects.

Best Mode 3

The inventors thought it necessary to develop a method capable of continuously correctly measuring the temperature of the molten iron with high precision and as a short time delay as possible.

As such a method, the inventors studied a new method capable of measuring the molten iron, in a stable condition, injected from a tap hole before a temperature drop occurs in tapping. As a result, it was found that such a method can be realized by using an optical fiber sheathed with a metallic tube, i.e., the temperature of the molten iron is measured by using a wire-shaped optical sensor unit comprising the optical fiber sheathed with a metallic tube to provide rigidity and appropriately designed corresponding to the state of the molten iron flow measured.

It was also found that backup of information of various sensor values by temperature information obtained by the new molten iron measurement method permits the more precise inference of heat conditions transition.

It was further found that by inferring the heat conditions by using an artificial intelligence system comprising an appropriate heat conditions estimation model and heat conditions correction model, each of which has a knowledge base containing measurement information about the molten iron temperature measured by the optical fiber, and measurement information from blast furnace sensors; and deciding whether the heat conditions is in a stationary state of an unstationary state, the correction action can be rapidly carried out for an operation factor of the blast furnace without a personal error.

The present invention has been achieved on the above-described finding.

The first method for controlling a heat conditions in a blast furnace, which has been described above, comprises the steps of;
  the step of providing a heat conditions estimation model formed by using an empirical rule and a expert knowledge for operations of a blast furnace;
  the step of inferring a heat conditions level and a heat conditions transition by using a heat conditions estimation model formed by using an empirical rule and a expert knowledge for operations of a blast furnace;
  the step of deciding whether the inferred heat conditions is in a stationary state or in an unstationary state;
  the step of taking an action of correcting an operation factor of the blast furnace by the operator using an empirical rule and a expert knowledge for operations of a blast furnace to control the temperature of the molten iron;
  wherein the heat conditions estimation model comprises
    the knowledge base for a heat conditions level inference including the measurement information on the molten iron temperature obtained from the optical fiber, and
    the knowledge base for heat conditions transition inference including the measurement information on the molten iron temperature obtained from the optical fiber and the measurement information from a blast furnace sensor.

The second method for controlling a heat conditions in a blast furnace comprises the steps of;
  the step of providing a heat conditions estimation model formed by using an empirical rule and a expert knowledge for operations of a blast furnace;
  the step of inferring a heat conditions level and a heat conditions transition by using a heat conditions estimation model formed by using an empirical rule and a expert knowledge for operations of a blast furnace;
  the step of deciding whether the inferred heat conditions is in a stationary state or in an unstationary state;
  the step of displaying the result of decision on the heat conditions by display means, and
  the step of taking an action of correcting an operation factor of the blast furnace by the operator using an empirical rule and a expert knowledge for operations of a blast furnace to control the temperature of the molten iron,
wherein the heat conditions estimation model comprises;
  the knowledge base for a heat conditions level inference including the measurement information on the molten iron temperature obtained from the optical fiber, and the knowledge base for heat conditions transition inference including the measurement information on the molten iron temperature obtained from the optical fiber and the measurement information from a blast furnace sensor.

The third method for controlling a heat conditions in a blast furnace comprises, automatically taking the action of correcting an operation factor of the blast furnace by using an artificial intelligence system to control the temperature of the molten iron;

the artificial intelligence system comprising the steps of;
a step of providing a heat conditions estimation model formed by using an empirical rule and expert knowledge for an operation of a blast furnace;
a step of inferring a heat conditions level and a heat conditions transition by using the heat conditions estimation model, on the basis of the obtained temperature information, to obtain the result of the inference of the heat conditions;
a step of deciding whether the inferred heat conditions is in a stationary state or in an unstationary state;
a step of providing a heat conditions correcting model formed by using the empirical rule and the expert knowledge for the operation of the blast furnace;
a step of taking the action of correcting an operation factor of the blast furnace by using the heat conditions correcting model, on the basis of the result of decision, which has been described above.

wherein the heat conditions estimation model comprises the knowledge base for a heat conditions level inference including the measurement information on the molten iron temperature obtained from the optical fiber, and the knowledge base for heat conditions transition inference including the measurement information on the molten iron temperature obtained from the optical fiber and the measurement information from a blast furnace sensor.

The Best mode 3 is described, as follows.

A method of controlling blast heat conditions of the present invention basically comprises the steps of measuring the temperature of a molten iron tapped through a tap hole, and taking the action of correcting an operation factor of a blast furnace by the operator based on the obtained temperature information, or the action of correcting an operation factor of the blast furnace by using an artificial intelligence system based on the obtained temperature information.

(1) Measuring a Molten Iron Temperature

The most characteristic of the present invention lies in the position and method of temperature measurement of the molten iron. On the basis of the obtained measurements, the heat conditions level and heat conditions transition are inferred, and on the basis of the measurements, a decision is made as to whether the heat conditions is in a stationary state or in an unstationary state. The decision is automatically made by using the predetermined heat conditions transition model.

As the position of measurement of the molten iron temperature which is considered as representative of the heat conditions level, it is preferable to use the temperature position nearest to the temperature of the molten iron in the furnace where the molten iron is injected from the tap hole during tapping. However, it is difficult to continuously correctly measure, in a stable state, the temperature of the molten iron accompanied with a violent flow. However, this difficulty is removed by inserting the optical fiber sheathed with a metallic tube into the molten iron flow and detecting the radiated light of the molten iron, which is emitted from the tip of the optical fiber.

The structure of the optical fiber sheathed with a metallic tube, which is used in the Best mode 3, is the same as in FIG. 1 of the Best mode 1. A temperature measurement apparatus used in the Best mode 3, is the same as in FIG. 2 of the Best mode 1.

(2) Flow of Heat Conditions Control

Figure 13:
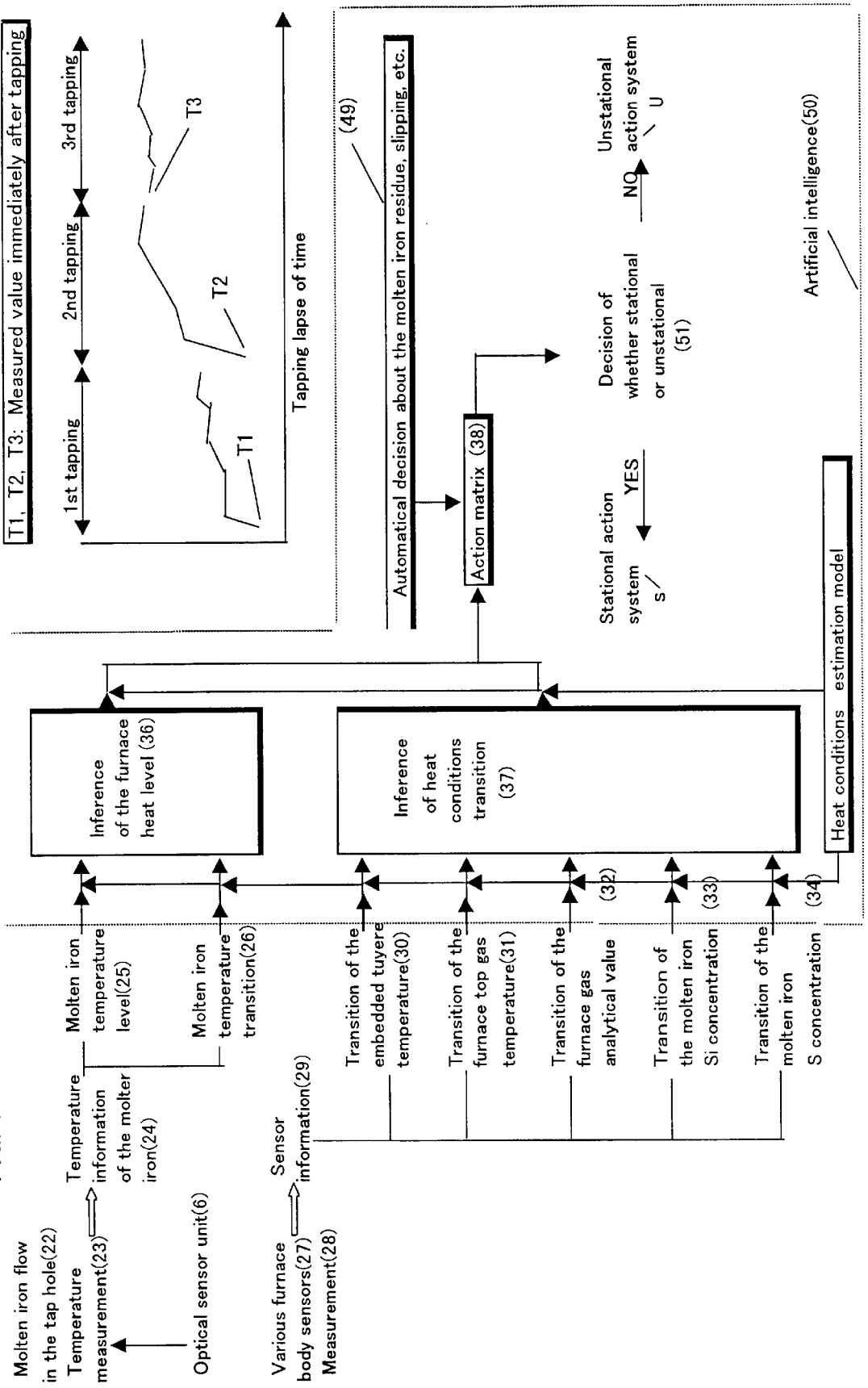
FIG. 13 is a flowchart of heat conditions control by the Best mode 3 of the present invention.

FIG. 13 shows a flowchart of heat conditions control of the present invention. An example of the method of controlling heat conditions of the present invention will be described with reference to the flowchart.

① The optical sensor unit (6) containing the optical fibers is inserted into a molten iron flow (22) in the tap hole of a blast furnace to obtain temperature information (24) of the molten iron by temperature measurement (23). The temperature measurement of the molten iron is continuously carried out in such a manner that the tapping time of about 3 to 4 hours is divided into sections at intervals of 20 minutes, and the average value of one section is considered as the representative temperature of the molten iron in this section, and determined as the molten iron level (25) in this section. The change in the molten iron temperature from the section just before this section to this section is considered as the molten iron temperature transition (26) in this section.

② On the other hand, the predetermined characteristic values are measured (28) by various furnace sensors (27) to obtain sensor information (29). The measurement object and the measurement frequency depend upon the type of the sensor used. For example, with the embedded tuyere sensor, the embedded tuyere temperature is obtained once a minute from the thermocouple embedded in the furnace body near the tuyere. In this way, on the bases of the information from each of the sensors, transition (30) of the embedded tuyere temperature (30), transition (31) of the furnace top gas temperature, transition (32) of furnace top gas analytical values, transition (33) of the molten iron Si concentration and transition (34) of the molten iron S concentration are obtained.

③ FIG. 14(a) shows an example of measurement results of the temperature of the molten iron, and FIG. 14(b) shows an example of measurement results of the embedded tuyere temperature.

In the method of measuring the temperature of the molten iron according to the present invention, the temperature measurements of the molten iron fall in the range of ±5° C. A heat conditions estimation model (35) for a blast furnace is previously formed by using empirical rule and/or expert knowledge for operations of the blast furnace. On the basis of the temperature level, the temperature inference, etc., which are obtained above in (1) and (2), the heat conditions level (36) and heat conditions transition (37) are inferd by using the heat conditions estimation model (35) for the blast furnace formed by using the empirical rule and/or expert knowledge for operations of the blast furnace.

The inference of the heat conditions level and heat conditions transition and detection of an abnormally low temperature are performed by the following methods:

[a] Inference of Heat Conditions Level:

In temperature measurement of the molten iron, since the molten iron injected from the tap hole is measured, the measured temperature is considered as substantially the same as the molten iron in the furnace appears. In addition, since the measurement data has high reliability, and continuous measurement is possible, the measurement interval can also be decreased. Therefore, the thus-obtained temperature level of the molten iron is sufficiently considered as the heat conditions level with high correctness and precision. Thus, the thus-obtained temperature of the molten iron is used as the present heat conditions level.

[b] Inference of Heat Conditions Transition:

The heat transition determined from data of each of the sensors is weighted by the predetermined method for each of the sensors, and the data of the sensors are integrated to determine heat conditions transition. The heat conditions transition is corrected by using transition of the molten iron temperature level to obtain future heat conditions transition. In this way, the data of each sensor is used as a standard for heat conditions transition because a change in heat conditions is detected by the value of each sensor earlier.

[c] Inference of Abnormality in Furnace Conditions:

Since, in an unstationary state of heat conditions, it is inferd that abnormality occurs in furnace conditions, it is important to set both a stationary region and an unstationary region in formation of the action matrix. The unstationary state appears as, for example, an abnormally low temperature.

As illustrated in a graph of molten iron temperature transition of FIG. 13, in molten iron temperature information (24), when the first measurements ($T_1$, $T_2$, $T_3$) of the temperature of the molten iron after tapping are abnormally low (in the case of an abnormally low temperature), as $T_1$ and $T_2$ in FIG. 3, it is inferd that the amount of the residual iron slag increases, the substance attached to the furnace wall falls, unreduced ore falls, or the substance deposited on the furnace wall of a high-vapor-pressure substance such as zinc or the like falls. In this case, an emergency action is required. The abnormally low temperature is previously defined on the basis of the empirical rule and/or results of observation of the tuyere.

④ The action matrix (38) is previously formed by using the heat conditions estimation model (35) with reference to the results of inference. The action matrix is used as a decision criterion for evaluating the present level of heat conditions, inferring future heat conditions transition, bringing the heat conditions level near the target level and maintaining the target heat conditions level, and is formed in a matrix comprising inference results of the heat conditions level and inference results of heat conditions transition. One characteristic of the present invention is that the action matrix is divided into a stationary state region and an unstationary state region.

First, each of the heat conditions level and heat conditions transition is divided into several ranks. For example, the heat conditions level is divided into ranks at intervals of a molten iron temperature of 10° C., and the heat conditions transition is divided into ranks at intervals of a heat conditions gradient of 10° C./min. On the other hand, for each of the heat conditions level and the heat conditions transition, a normal region and an abnormal region are determined by using the empirical rule and/or expert knowledge. It is assumed that the normal region of the heat conditions level is divided into 7 ranks centered at a rank including the target heat conditions level and comprising 3 ranks each above and below the center rank, and the normal region of heat conditions transition is divided into 5 ranks centered at a rank including the target heat conditions transition and comprising 2 ranks each above and below the center rank. In this case, the region of 7×5 ranks corresponding to the normal region is considered as the stationary state region. The region outside the stationary state region is considered as the unstationary state region. The range of one rank is determined by the empirical rule and/or expert knowledge.

Figure 15:
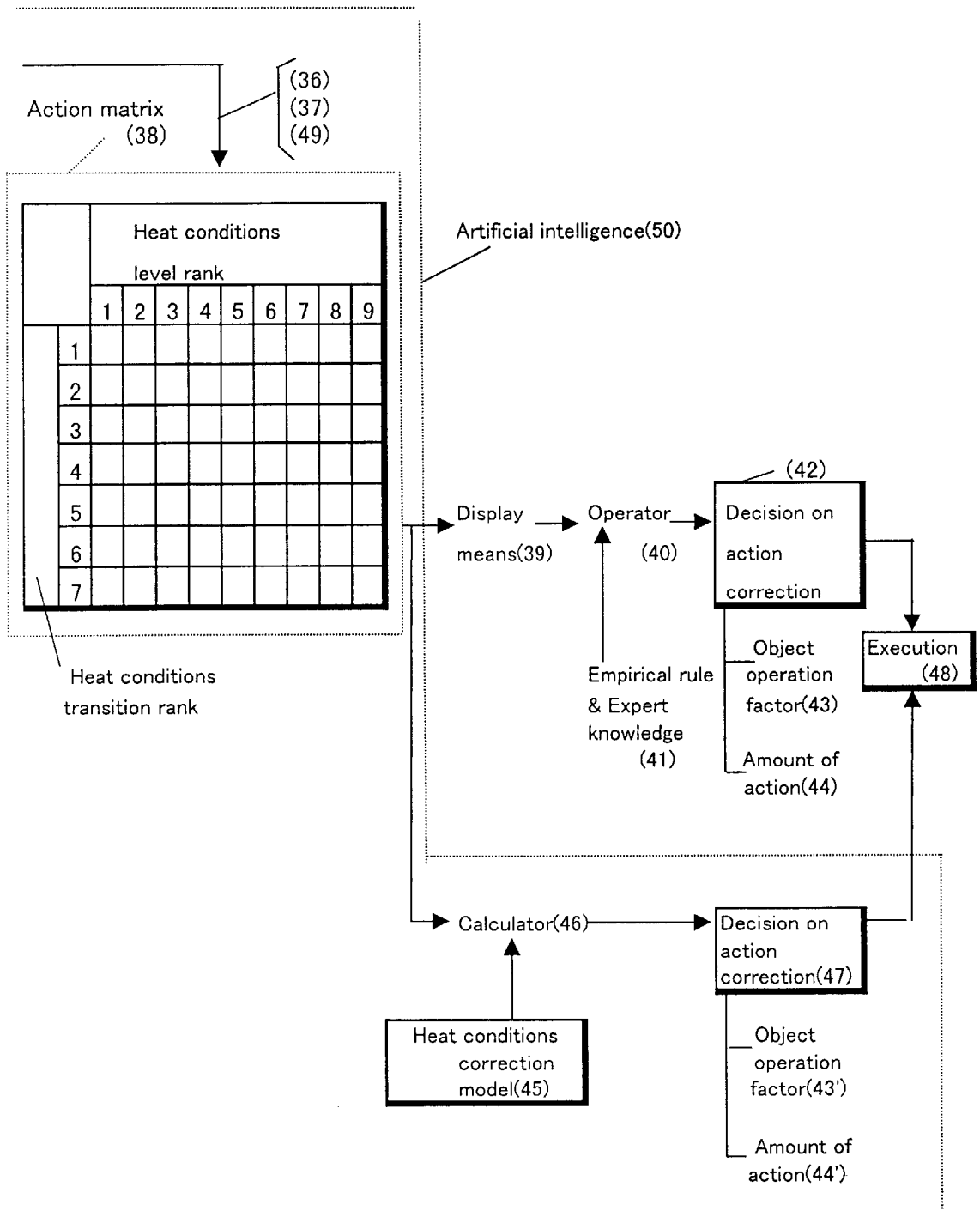
FIG. 15 is a flowchart illustrating a correction action method when heat conditions is in a stationary state by the Best mode 3.
Figure 16:
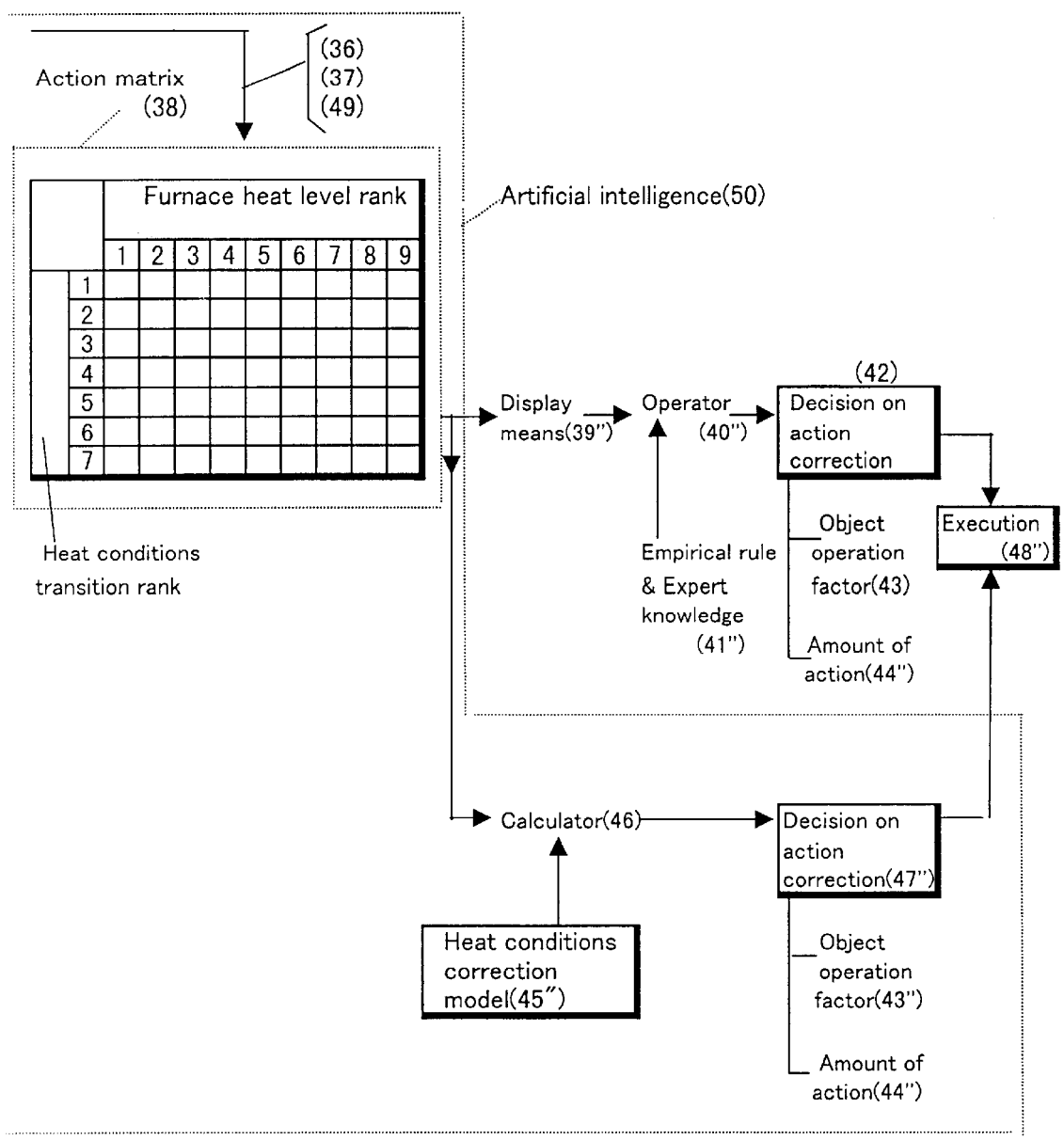
FIG. 16 is a flowchart illustrating a correction action method when heat conditions is in an unstationary state by the Best mode 3.

FIG. 15 and FIG. 16 show examples of the thus-formed action matrix. In the action matrix, the region including the heat conditions level ranks 1 to 7 and the heat conditions transition ranks 1 to 5 is the stationary state region, and the peripheral region thereof is the unstationary region.

⑤ The results of the inference of the heat conditions level and the heat conditions transition obtained above in ③ are placed at corresponding positions in the action matrix. Namely, by using the action matrix, a decision is made as to whether the heat conditions is in a stationary state (YES) or an unstationary state (NO). Then, the correction action is executed. In the case of the stationary state, the action advances to the action system (S) for the stationary state to execute the correction action according to the flow shown in FIG. 15. In the case of the unstationary state, the action advances to the action system (U) for unstationary state to execute the correction action according to the flow shown in FIG. 16. Of course, the both actions have different correction contents, i.e., action correction is slowly made in the case of the stationary state, while in the case of the unstationary state, action correction is rapidly made by a large change to deal with an emergency. Both actions are the same except this point.

⑥ Then, the unstationary state is described with reference to the flow of the correction action shown in FIG. 16. The correction action includes two cases, i.e., the case in which the information of the action matrix is displayed on a screen (39), and the operator performs the action on the basis of the information displayed on the screen, and the case in which the information of the action matrix is input in an artificial intelligence system (50) to automatically perform the action by using a machine.

[a] In the case in which the operator performs the correction action, the object operation factor (43") of the action and the amount of action (44") are finally determined (42") by operator's decision.

[b] In the case in which the correction action is mechanically performed by the artificial intelligence system, the object operation factor (43") of the action and the action amount (44") are determined (47") by a calculator (46) according to the heat conditions correction model (45") for unstationary heat conditions previously formed by using the empirical rule and/or expert knowledge for operations of the blast furnace.

The thus-determined correction action is executed to control the molten iron temperature to be kept at the target value, thereby controlling the heat conditions in the unstationary state.

⑦ The correction action is performed by changing the set condition of an operation factor of the blast furnace. Main factors which determine the heat conditions include the moisture in hot blast, the temperature of hot blast, the PC ratio (the ratio of the pulverized coal brown in), the coke ratio (the ratio of the coke loaded), and the like. However, in order to adjust the temperature of the molten iron, it is convenient to control the moisture of hot blast. The temperature of the molten iron may be increased by decreasing the amount of the steam added.

In this way, the presence of residual slag, slipping, or the like can be automatically detected (49), whether the heat conditions is stationary or unstationary can be automatically decided (51), and the set condition of an operation factor can be automatically appropriately changed.

The present invention will be described in further detail below with reference to examples.

A blast furnace was operated by the method of controlling heat conditions of the present invention using the molten iron temperature measurement apparatus shown in FIG. 2 and the optical sensor unit for measuring the molten iron temperature, which had the structure shown in FIG. 1. The heat conditions was automatically controlled by using a control system containing artificial intelligence according to the flow of heat conditions control shown in FIG. 13, FIG. 15 or FIG. 16. Details were as follows:

The optical sensor unit 6 has a wire-shaped double structure in which a quartz glass optical fiber 1 as an element wire having a diameter of 25 μm was sheathed with a stainless sheath tube (inner tube) having an outer diameter of 1.2 mm, an inner diameter of 0.8 mm, and a thickness of 0.2 mm, and a stainless sheath tube (outer tube) having an outer diameter of 3.6 mm, an inter diameter of 3.0 mm, and a thickness of 0.3 mm. The optical sensor unit 6 was inserted into an injected molten iron flow 8 under tapping while being slipped in the guide pipe 15 having an inner diameter of 6 mm and an outer diameter of 10 mm. The feed speed of the optical sensor unit 6 was set to 400 mm/sec. The time required for one temperature measurement was about 10 to 20 seconds so that the temperature was continuously measured for this time. The time of one tapping was about 3 to 4 hours so that the temperature of the molten iron flow 8 was measured 8 to 10 times in this tapping time. The target value of the temperature of molten iron was 1505° C., and the temperature of the molten iron was controlled by adjusting the moisture in hot blast.

Figure 17:
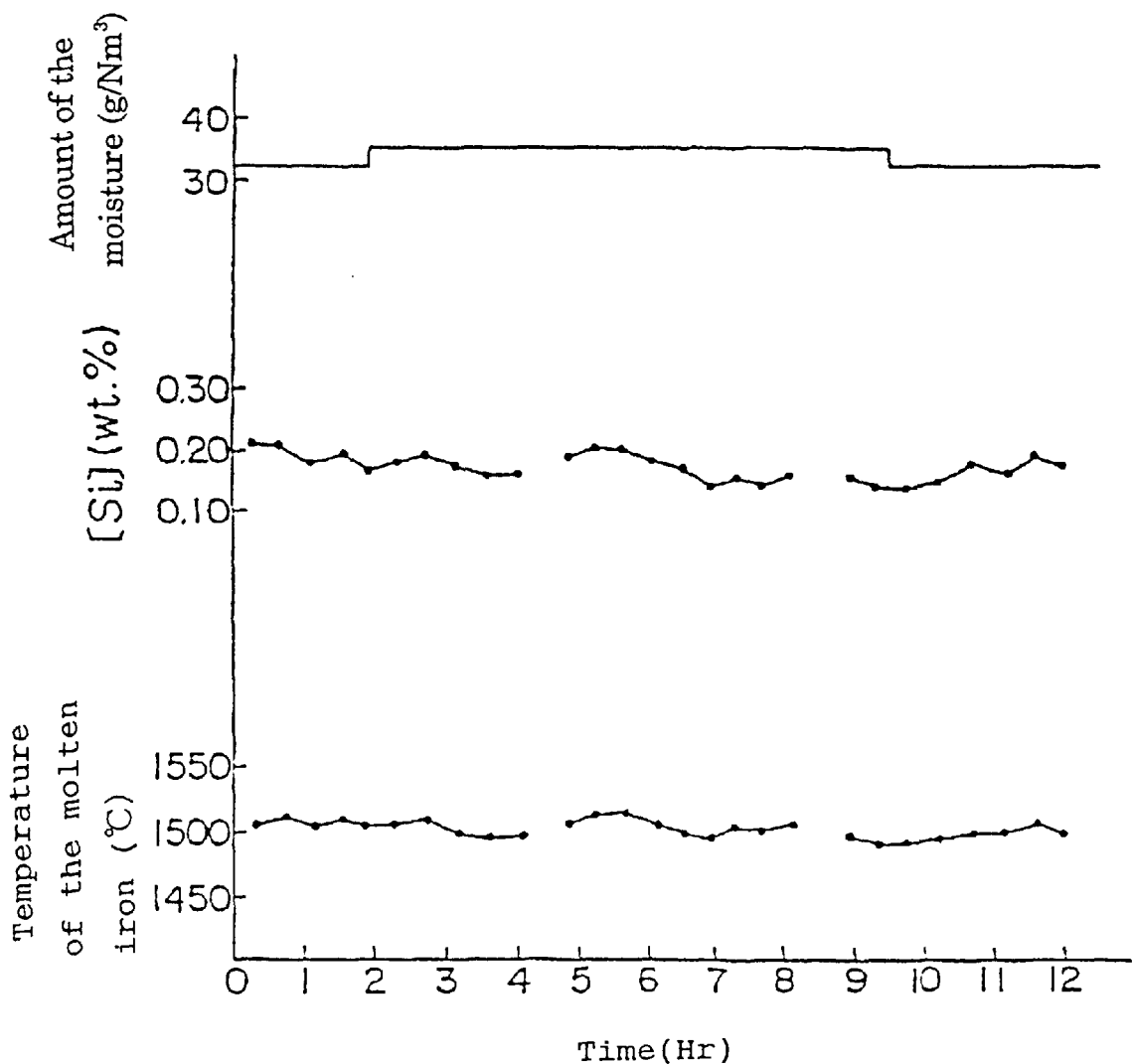
FIG. 17 is a graph showing changes with time of the measurements of the molten iron temperature, the Si concentration of the molten iron and the amount of the moisture added to hot blast by the Best mode 3 of the present invention.

(Test Result-1):

FIG. 17 shows changes with time of the measurements of the molten iron temperature, the Si concentration of the molten iron and the amount of the moisture added to hot blast in three times of tapping. An abnormally low temperature was observed in the first molten iron temperature after the start of each tapping. Namely, it was decided that the heat conditions was in a stationary state. Thus, in the step (51) of deciding whether heat conditions is stationary or unstationary shown in FIG. 13, it was decided that the heat conditions was stationary, and the flow advanced to the action system (S) for the stationary state in which decision on action correction (47) was made by the artificial intelligence (50) system, and correction action was executed (48). In this way, the temperature of the molten iron was controlled to control the heat conditions.

As a result, during the tapping time, the temperature of the molten iron was controlled in a temperature range of as narrow as 1495 to 1515° C. During this time, the Si concentration of the molten iron was in the range of 0.15 to 0.21 wt %, resulting in the production of a low-silicon molten iron having an average Si concentration of 0.18 wt %.

On the other hand, as a conventional method of controlling the temperature of a molten iron, the temperature of the molten iron was measured by an immersion type thermometer in the skimmer, and on the basis of the measured value, the moisture of hot blast was adjusted to control the temperature of the molten iron to the set target value of 1505° C.

Figure 18:
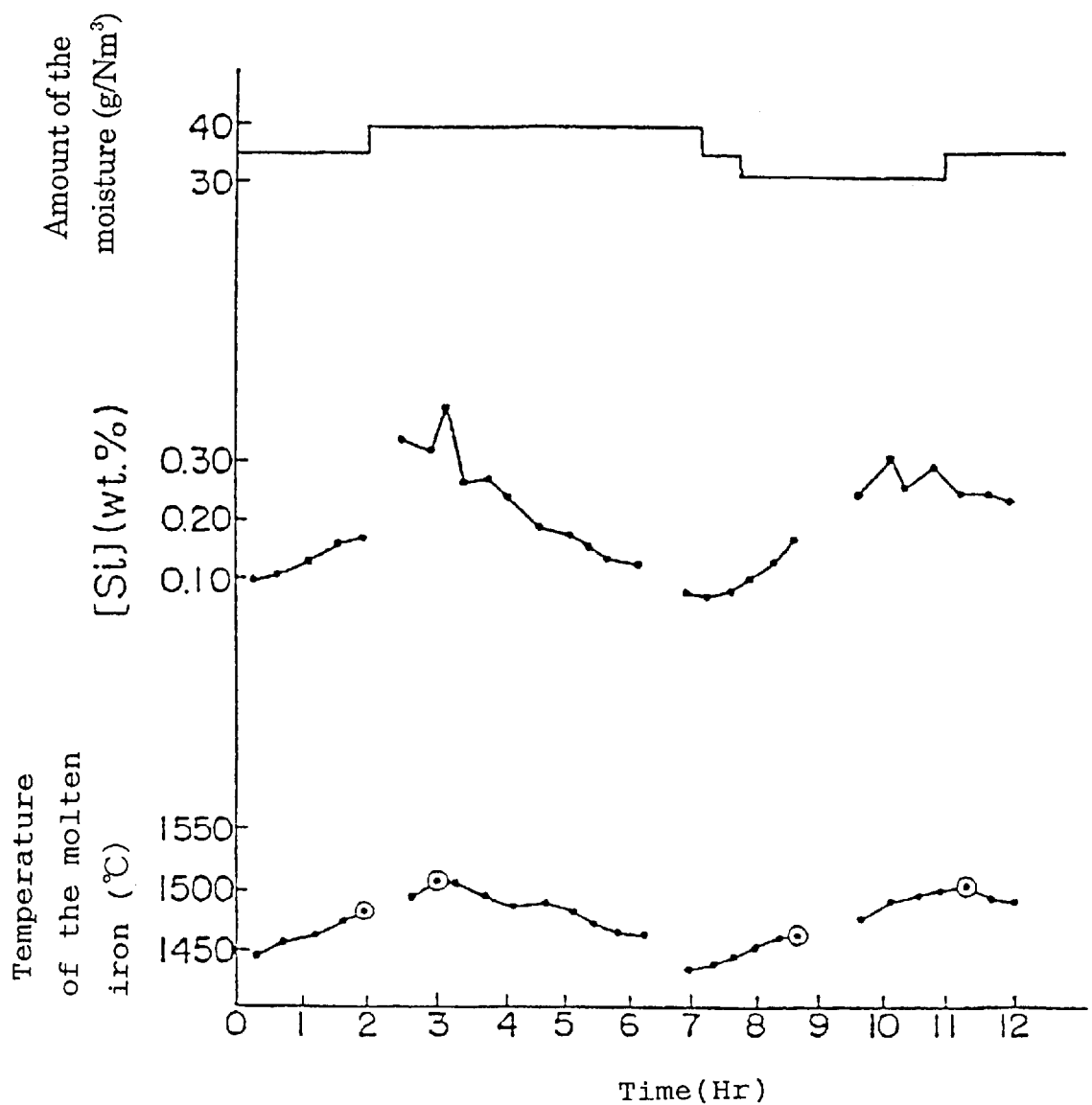
FIG. 18 is a graph showing changes with time of the measurements of the molten iron temperature, the Si concentration of the molten iron and the amount of the moisture added to hot blast in a conventional method.

FIG. 18 shows changes with time of the measurements of the molten iron temperature in the skimmer, the Si concentration of the molten iron, and the amount of the moisture added to hot blast in four times of tapping. In each time of tapping, the temperature of the molten iron greatly changes, and in most cases, the temperature is the highest values in the last stage. Although such temperature transition in tapping is mainly due to cooling of the molten iron in the runner, it is impossible to make decision from only this result as to whether heat conditions is in a stationary or unstationary state. Therefore, conventionally, the operator makes the decision in all-around consideration of the empirical rule obtained from past actual operations, abnormal behaviors of the values of various furnace sensors, or the results of observation of the furnace conditions from the tuyere, and the like. It was thus impossible to automatically decide by the artificial intelligence system whether the heat conditions was stationary or unstationary. Also, unlike in the present invention, an early decision was impossible, and the decision was accompanied with personal error.

On the other hand, the temperature of the molten iron was insufficiently controlled, thereby causing not only great changes in the measurements of the molten iron temperature in the skimmer but also great changes in the molten iron temperature in the furnace.

In this way, in the conventional method of controlling heat conditions in an operation of a blast furnace, it is difficult to rapidly correctly infer the temperature of the molten iron with high precision. Therefore, in order to previously prevent a trouble in the operation from occurring due to an abnormal decrease in heat conditions, the control standard for the molten iron temperature is set to a value higher than the temperature level necessary for actual operations to control the heat conditions to a higher level on the safety side. When the temperature of the molten iron is controlled to a higher level, the amount of the coke used as fuel must be increased, thereby causing In addition, as the molten iron temperature increases, reaction of transition of Si into the molten iron represented by the following reaction formulae proceeds to increase the Si concentration of the molten iron:

(1)

(2)

wherein:

Equation (1): Reaction of Si transition into the molten iron by slag-metal reaction Equation (2): Reaction of Si transition into the molten iron through SiO gas As the Si concentration of the molten iron increases, the consumption of lime used as a flux in refining of a molten iron as a raw material in the next steel making process increases. This decreases the Fe yield due to an increase in the amount of steel slag, thereby causing the problem of increasing the amount of steel slag.

On the other hand, the method of controlling heat conditions of the present invention is capable of controlling the heat conditions in a stable condition, thereby decreasing the control level of the molten iron temperature to the target temperature level necessary for actual operations. Therefore, there is no need to use excessive coke. Also the temperature of the molten iron can be controlled to a lower level, and thus the Si concentration of the molten iron can be stabilized in the range of as low as 0.15 to 0.21 wt %, for example. It is also possible to prevent the occurrence of an operation trouble due to an abnormal decrease in heat conditions.

(Test-Result 2)

Figure 19:
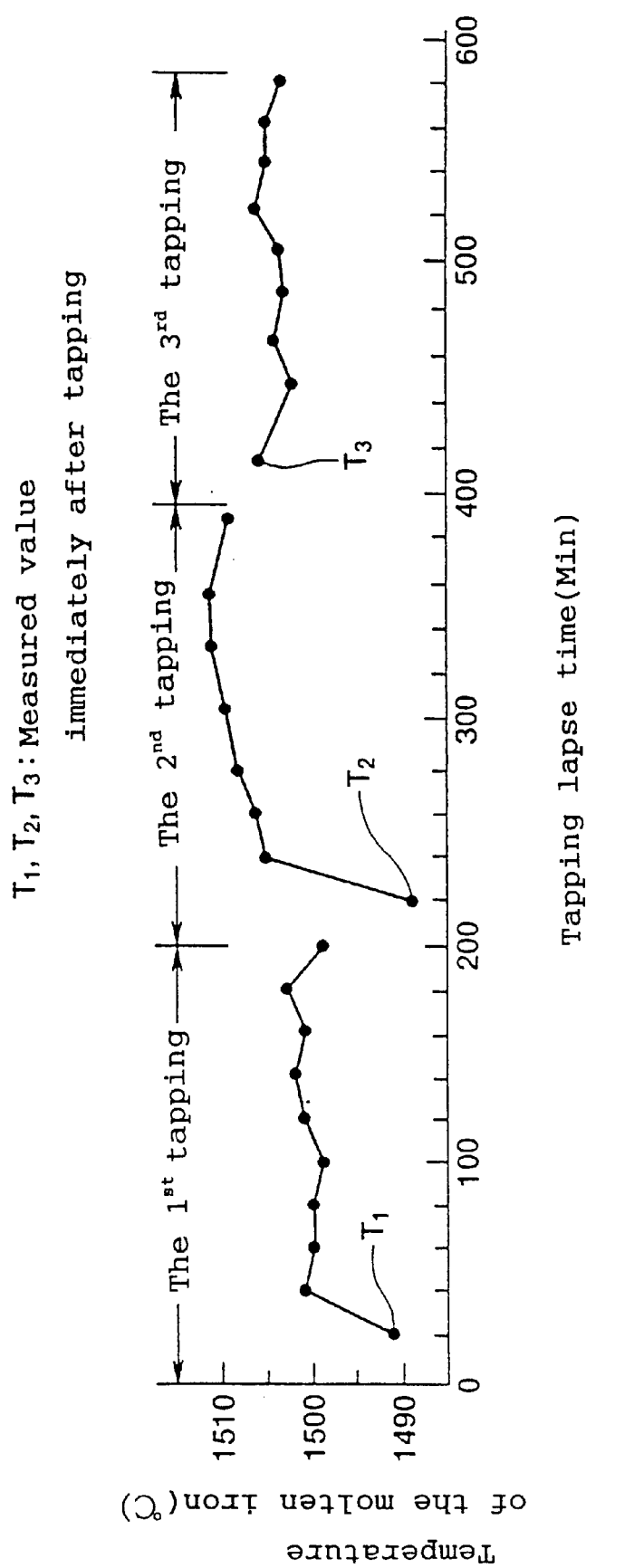
FIG. 19 is a graph showing an example of an abnormally low temperature of a molten iron which indicates an abnormal state of heat conditions and which is detected by the Best mode 3 of controlling heat conditions of the present invention.

FIG. 19 shows changes in the temperature when the first molten iron temperature after tapping was an abnormally low temperature in an operation of a blast furnace wherein the heat conditions was controlled by the method of the embodiment. As described above, the elapsed time since the start of tapping was divided into sections at intervals of 20 minutes, and the average in one section was considered as the representative molten iron temperature and shown by one plot of the molten iron temperature. In FIG. 19, in first and second tapping, only the first temperature of the molten iron is an abnormally low temperature. Such an abnormally low temperature only in the first measurement is due to the following: Because of an increase in the residual iron slag, fall of the substance attached to the furnace wall, fall of unreduced ore, or fall of the substance deposited on the furnace wall of a high-vapor-pressure metal such as zinc or the like, the molten iron temperature near the tap hole abnormally decreased. Therefore, the molten iron of an abnormally low temperature flowed out in the initial stage of tapping, and the molten iron of normal temperature in an upper portion flowed out with the passage of tapping time. In the second tapping through the tap hole opposite to the tap hole of the first tapping, for the same reasons as the above, only the initial molten iron temperature after tapping was an abnormally low temperature. In third tapping, the initial temperature of the molten iron was not an abnormally low temperature. This indicates that the casual substance as a direct cause of an abnormally low temperature was removed before the start of the third tapping.

Although it is conventionally impossible to detect such an abnormally low temperature of the molten iron from the initial measurements of the molten iron temperature after tapping, the present invention enables such a detection. This also enables precise rapid detection of the occurrence of residual slag, ore or a substance, and quantitative determination of the scale thereof.

As described above, the present invention can precisely control the molten iron temperature to the target level in a narrow temperature range in an operation of a blast furnace, and automatically early detect an abnormal state of heat conditions with high precision. Therefore, it is possible to realize stabilization of furnace conditions in a high level by good heat conditions control, which has not been achieved so far. As a result, the following effects are exhibited.

I. It is possible to cope with an operation of a blast furnace with higher flexibility for a plan of the production process, thereby improving productivity, absorption of variations in demand and supply of a raw material and productivity.

J. It is possible to produce a low-Si molten iron in a stable condition, decrease the coke ratio, increase the life of the refractory, improve the utilization factor of gases in a stable condition, and decease the production cost of a molten iron due to a decrease in the cost unit of an auxiliary raw material, as well as save the raw material resources.

K. It is possible to completely remove a critical trouble in an operation of a blast furnace due to abnormality in heat conditions, increase the life of the bast furnace, and decrease repair cost.

L. Automation of heat conditions control permits significant saving of power, promotion of realization of centralized control of a plurality of blast furnaces and unmanned operation control, and further saving of power.

The present invention can provide such a method of controlling blast heat conditions, and exhibits industrially useful effects.

What is claimed is:

1. A method for operating a blast furnace to produce a molten iron comprising the steps of:
   preparing an optical fiber covered with a metallic tube;
   measuring a temperature of molten iron flow discharged from a tap hole of the blast furnace by the optical fiber covered with the metallic tube to obtain information of the temperature of the molten iron; and
   controlling heat conditions in the blast furnace based on the obtained information of the temperature of the molten iron.

2. The method according to claim 1, wherein the molten iron flow is a jet flow dropping from a tap hole until a runner.

3. The method according to claim 1, wherein the step of controlling the heat conditions in the furnace comprises:
   producing the molten iron having a silicon content of 0.3 wt. % or less.

4. The method according to claim 1, wherein the step of controlling the heat conditions in the furnace comprises:
   controlling the heat conditions in the furnace; and,
   reducing a fuel ratio.

5. The method according to claim 1, wherein the step of controlling the heat conditions in the blast furnace comprises:
   determining a control target temperature $T_1$ which is lower than a control target temperature $T_2$ by measuring the temperature of the molten iron in a skimmer;
   determining a control temperature tolerance range from $(T_1+Ta)$ to $(T_1-Ta)$, on the basis of the control target temperature $T_1$, wherein Ta is a tolerance temperature; and
   taking an operational correcting action for maintaining the control temperature tolerance range.

6. Thye method according to claim 1, wherein the step of controlling the heat conditions in the furnace comprises:
   (a) determining a control target temperature $T_1$ which is lower than a control target temperature $T_2$ by measuring the molten temperature of the molten iron in a skimmer;
   (b) determining a control temperature tolerance range +Ta which is narrower than a control temperature tolerance range +Tb, by measuring the temperature of the molten iron in the skimmer;
   (c) taking an operational correcting action for maintaining the control temperature tolerance range from $(T_1-Ta)$ to $(T_1+Ta)$.

7. The method according to claim 1, further comprising the step of detecting an activation degree of a dead man of the blast furnace, based on the obtained information of the molten iron temperature.

8. The method according to claim 7, wherein the step of detecting the activation degree of the dead man of the blast furnace comprises:
   comparing a molten iron temperature($T_s$) at an initial tapping time with a minimum molten iron temperature ($T_{min}$) during the tapping time, except for the initial tapping time, to calculate $\Delta T=T_s-T_{min}$;
   continuing the step of comparing the molten iron temperature, during at least two taps or more; and
   determining a state of the dead man from the $\Delta T$.

9. The method according to claim 1, further comprising injecting pulverized coal into the furnace in an amount based on the obtained information of the molten iron temperature.

10. The method according to claim 1, wherein the step of controlling the heat conditions in the blast furnace comprises:
   providing an estimation model of the heat conditions in the blast furnace by using an previous knowledge of conditions for the operation of the blast furnace;
   inferring a level of the heat conditions in the furnace and a transition of the heat conditions in the furnace by using the estimation model of the heat conditions in the furnace, on the basis of the obtained temperature information, to obtain an inferred result of the heat conditions in the furnace;
   correcting an operational factor of the blast furnace by using the previous knowledge of conditions for the operation of the blast furnace, on the basis of the obtained temperature information, to control the temperature of the molten iron.

11. The method according to claim 10, wherein the estimation model of the heat conditions in the furnace comprises:
   a knowledge base for inferring the heat conditions in the furnace, including the information of the molten iron temperature obtained by the optical fiber with
   a knowledge base for inferring the transition of the heat conditions in the blast furnace, including the information of the molten iron temperature obtained by the optical fiber and measurement information of a sensor of the blast furnace.

12. The method according to claim 1, wherein the step of controlling the heat conditions in the furnace comprises:
   providing an estimation model of the heat conditions in the furnace by using previous knowledge of conditions for the operation of the blast furnace;
   inferring a level of the heat conditions in the furnace and a transition of the heat conditions of the furnace by using the estimation model of the heat conditions of the furnace, on the basis of the obtained information of the molten iron temperature, to obtain an inference of the level of the heat conditions and the transition of the heat conditions in the furnace;
   displaying the result of the inferred heat conditions in the furnace by a display means;
   correcting an operational factor of the blast furnace by previous knowledge of conditions for the operation of the blast furnace, on the basis of the displayed inferred result, to control the temperature of the molten iron.

13. The method according to claim 12, wherein the estimation model of the heat conditions in the furnace comprises:
   a knowledge base for inferring the heat conditions in the furnace, including the information of the molten iron temperature obtained by the optical fiber; and
   a knowledge base for inferring the heat conditions in the furnace, including the information of the molten iron temperature obtained by the optical fiber and the measurement information of the sensor of the blast furnace.

14. The method according to claim 13, further comprising controlling the furnace temperature of the blast furnace comprising:
   (a) developing an artificial intelligence system comprising:
      (i) providing an estimation model of the heat conditions in the furnace by using previous knowledge of conditions for the operation of the blast furnace;
      (ii) inferring a level of the heat conditions in the furnace and a transition of the heat conditions in the furnace, by using the estimation model of the heat conditions in the furnace, on the basis of the obtained information of the molten iron temperature, to obtain an inferred result of the level of the heat conditions in the furnace and the transition of the heat conditions in the furnace; and
      (iii) providing a correcting model of the heat conditions in the furnace by using the previous knowledge of conditions for the operation of the blast furnace; and
   (b) automatically correcting an operational factor of the blast furnace by applying the artificial intelligence system to use the correcting model of the heat conditions in the furnace, on the basis of the inferred result, to control the temperature of the molten iron.

15. The method according to claim 14, wherein the estimation model of the heat conditions in the furnace comprises:
   a knowledge base for inferring the heat conditions in the furnace, including the information of the molten iron temperature obtained by the optical fiber; and
   a knowledge base for inferring the transition of the heat conditions in the furnace, including the information of the molten iron temperature obtained by the optical fiber and the measurement information in the sensor of a blast furnace.

16. The method according to claim 1, wherein the step of controlling the heat conditions in the blast furnace comprises:
   providing an estimation model of the heat conditions in the furnace by using previous knowledge of conditions for the operation of the blast furnace;
   inferring a level of the heat conditions in the furnace and a transition of the heat conditions in the furnace, by using the estimation model of the heat conditions in the furnace by using previous knowledge of conditions for the operation of the blast furnace;
   providing an estimation model of the heat conditions in the furnace, by using previous knowledge of conditions for the operation of the blast furnace;
   inferring a level of the heat conditions and a transition of the conditions in the furnace by using the previous knowledge for the operation of the blast furnace;
   deciding whether the inferred heat conditions are in the stationary state or in the unstationary state;
   displaying the decided result of the heat conditions in the furnace by a display means; and
   correcting an operational factor of the blast furnace by an operator using the previous knowledge of conditions for the operation of the blast furnace, to control the temperature of the molten iron.

17. The method according to claim 16, wherein the estimation model of the heat conditions of the blast furnace comprises:
   a knowledge base for inferring the heat conditions in the furnace, including the information of the molten iron temperature by the optical fiber;
   a knowledge base for inferring the transition of the heat conditions in the furnace, including an information of the molten iron temperature by the optical fiber and a measurement information of a sensor of the blast furnace.

18. A method for operating the blast furnace according to claim 1, wherein the step of controlling the heat conditions of the blast furnace comprises;
   providing the estimation model of the heat conditions in the furnace, formed by using the empirical rule and the expert knowledge for the operation of the blast furnace;
   inferring the level of the heat conditions and the transition of the heat transitions by using the heat conditions in the furnace, formed by using the empirical rule and the expert knowledge for the operation of the blast furnace;
   deciding whether the inferred heat conditions is in the stationary state or in the unstationary state;
   displaying the decided result of the heat conditions in the furnace by the display means; and
   taking the correcting action of the operational factor of the blast furnace by the operator using the empirical rule and the expert knowledge for the operation of the blast furnace, to control the temperature of the molten iron.

19. The method of claim 18, wherein the estimation model of the heat conditions in the furnace comprises:
- a knowledge base for inferring the level of the heat conditions in the furnace, including measurement information of the molten iron temperature obtained by the optical fiber, and
- a knowledge base for inferring the transition of the heat conditions in the furnace, including measurement information of th molten iron temperature obtained by the optical fiber and measurement information obtained by a sensor in the blast furnace. conditions in the furnace, including the measurement information on the molten iron temperature obtained from the optical fiber, and
- the knowledge base for inferring the transition of the heat conditions in the furnace, including the measurement information on the molten iron temperature obtained from the optical fiber and the measurement information by the sensor of the blast furnace.

20. The method according to claim 1, wherein the step of controlling the heat conditions of the blast furnace comprises:
- (a) developing an artificial intelligence system which comprises:
  - (i) providing an estimation model of the heat conditions in the furnace by using previous knowledge of conditions for the operation of the blast furnace;
  - (ii) inferring a level of the heat conditions and a transition of the heat conditions in the furnace by using the estimation model of the heat conditions in the furnace, on the basis of the obtained information of the molten iron temperature, to obtain an inferred result of the heat Sconditions in the furnace;
  - (iii) deciding whether the inferred heat conditions in the furnace are in the stationary stare or in the unstationary state; and
  - (iv) providing a correcting model of the heat conditions in the furnace by using the previous knowledge of conditions for the operation of the blast furnace; and
- (b) automatically correcting an operational factor of the blast furnace by applying the artificail intelligence system to use the correcting model of the heat conditions in the furnace, on the basis of the inference of the heat conditions in the furnace.

21. The method of claim 29, wherein the estimation model of the heat conditions of the blast furnace comprises:
- a knowledge base for inferring the level of the heat conditions in the furnace, including measurement information of the molten iron temperature obtained by the optical fiber, and
- a knowledge base for inferring the transition of the heat conditions in the furnace, including measurement information of the molten iron temperature obtained by the optical fiber and measurement information obtained by a sensor in the blast furnace.

* * * * *